United States Patent [19]
Van Seters et al.

[11] Patent Number: 6,108,692
[45] Date of Patent: *Aug. 22, 2000

[54] METHOD AND APPARATUS FOR INTERNETWORKING BUFFER MANAGEMENT

[75] Inventors: Stephen L. Van Seters, Stow; Stephen A. Hauser, Burlington; Mark A. Sankey, Acton; Christopher P. Lawler, Wellesley, all of Mass.

[73] Assignee: 3Com Corporation, Santa Clara, Calif.

[*] Notice: This patent is subject to a terminal disclaimer.

[21] Appl. No.: 09/024,415

[22] Filed: Feb. 17, 1998

Related U.S. Application Data

[63] Continuation of application No. 08/501,355, Jul. 12, 1995, Pat. No. 5,812,775.

[51] Int. Cl.[7] ................................................. G06F 15/167
[52] U.S. Cl. ........................................... 709/213; 711/153
[58] Field of Search ........................... 711/153; 709/213, 709/215, 214; 395/200.43, 200.45, 200.44

[56] References Cited

U.S. PATENT DOCUMENTS

| | | |
|---|---|---|
| 4,455,602 | 6/1984 | Baxter, III et al. . |
| 4,488,004 | 12/1984 | Bogart et al. . |
| 4,525,780 | 6/1985 | Bratt et al. . |
| 4,562,436 | 12/1985 | Coleman et al. . |
| 4,578,796 | 3/1986 | Charalambous et al. . |
| 4,587,651 | 5/1986 | Nelson et al. . |
| 4,597,077 | 6/1986 | Nelson et al. . |
| 4,645,874 | 2/1987 | Fildes . |
| 4,663,748 | 5/1987 | Karbowiak et al. . |
| 4,679,191 | 7/1987 | Nelson et al. . |
| 4,713,806 | 12/1987 | Oberlander et al. . |
| 4,720,850 | 1/1988 | Oberlander et al. . |
| 4,748,618 | 5/1988 | Brown et al. . |
| 4,750,114 | 6/1988 | Hirtle . |
| 4,768,149 | 8/1988 | Konopik et al. . |
| 4,831,620 | 5/1989 | Conway et al. . |
| 4,835,674 | 5/1989 | Collins et al. . |
| 4,843,606 | 6/1989 | Bux et al. . |
| 4,872,158 | 10/1989 | RIchards . |
| 4,872,159 | 10/1989 | Hemmady et al. . |
| 4,872,160 | 10/1989 | Hemmady et al. . |
| 4,875,206 | 10/1989 | Nichols et al. . |
| 4,893,302 | 1/1990 | Hemmady et al. . |
| 4,894,824 | 1/1990 | Hemmady et al. . |
| 4,899,333 | 2/1990 | Roediger . |
| 4,912,656 | 3/1990 | Cain et al. . |
| 4,922,486 | 5/1990 | Lidinsky et al. . |
| 4,933,846 | 6/1990 | Humphrey et al. . |
| 4,939,728 | 7/1990 | Markkula, Jr. et al. . |
| 4,954,951 | 9/1990 | Hyatt . |
| 4,955,018 | 9/1990 | Twitty et al. . |
| 4,958,341 | 9/1990 | Hemmady et al. . |
| 5,021,949 | 6/1991 | Morton et al. . |
| 5,042,000 | 8/1991 | Baldwin . |
| 5,048,014 | 9/1991 | Fischer . |
| 5,095,480 | 3/1992 | Fenner . |
| 5,101,402 | 3/1992 | Chiu et al. . |
| 5,113,522 | 5/1992 | Dinwiddie, Jr. et al. . |
| 5,123,029 | 6/1992 | Bantz et al. . |
| 5,127,104 | 6/1992 | Dennis . |

(List continued on next page.)

*Primary Examiner*—Kenneth R. Coulter
*Attorney, Agent, or Firm*—Weingarten, Schurgin, Gagnebin & Hayes LLP

[57] ABSTRACT

A method and apparatus for receiving and transmitting network frames via an internetworking device, in which a first portion of a total number of buffers is allocated among port-dedicated buffer pools, and a second portion is placed in a common pool accessible by any of the network ports. A frame is received at a first port, and a list of buffers accessible only by that port is referenced to identify buffers not already in use. A second list of buffers in the common pool is referenced to identify unused buffers for use if insufficient unused buffer space is available in the port-dedicated buffer pool. Frame data is then stored in the identified buffer(s). Upon retransmission, the buffer(s) used to store the. transmitted frame is released to the port-dedicated and/or common buffer pool(s).

11 Claims, 16 Drawing Sheets

6,108,692
Page 2

U.S. PATENT DOCUMENTS

| | | |
|---|---|---|
| 5,144,692 | 9/1992 | Baker et al. . |
| 5,155,809 | 10/1992 | Baker et al. . |
| 5,163,138 | 11/1992 | Thirumalai . |
| 5,185,877 | 2/1993 | Bissett et al. . |
| 5,200,954 | 4/1993 | Teel, Jr. et al. . |
| 5,210,748 | 5/1993 | Onishi et al. . |
| 5,235,595 | 8/1993 | O'Dowd . |
| 5,251,205 | 10/1993 | Callon et al. . |
| 5,265,207 | 11/1993 | Zak et al. . |
| 5,280,474 | 1/1994 | Nickolls et al. . |
| 5,282,199 | 1/1994 | Hertzberg et al. . |
| 5,283,868 | 2/1994 | Baker et al. . |
| 5,291,444 | 3/1994 | Scott et al. . |
| 5,299,193 | 3/1994 | Szczepanek . |
| 5,301,303 | 4/1994 | Abraham et al. . |
| 5,305,280 | 4/1994 | Hayano . |
| 5,305,317 | 4/1994 | Szczepanek . |
| 5,307,345 | 4/1994 | Lozowick et al. . |
| 5,309,432 | 5/1994 | Kanakia . |
| 5,317,568 | 5/1994 | Bixby et al. . |
| 5,321,819 | 6/1994 | Szczepanek . |
| 5,321,843 | 6/1994 | Shoji et al. . |
| 5,325,356 | 6/1994 | Lyles . |
| 5,327,421 | 7/1994 | Hiller et al. . |
| 5,327,428 | 7/1994 | Van As et al. . |
| 5,329,630 | 7/1994 | Baldwin . |
| 5,331,191 | 7/1994 | Sugiura et al. . |
| 5,331,315 | 7/1994 | Crosetto . |
| 5,331,634 | 7/1994 | Fischer . |
| 5,333,268 | 7/1994 | Douglas et al. . |
| 5,355,365 | 10/1994 | Bhat et al. . |
| 5,355,453 | 10/1994 | Row et al. . |
| 5,432,784 | 7/1995 | Ozveren . |

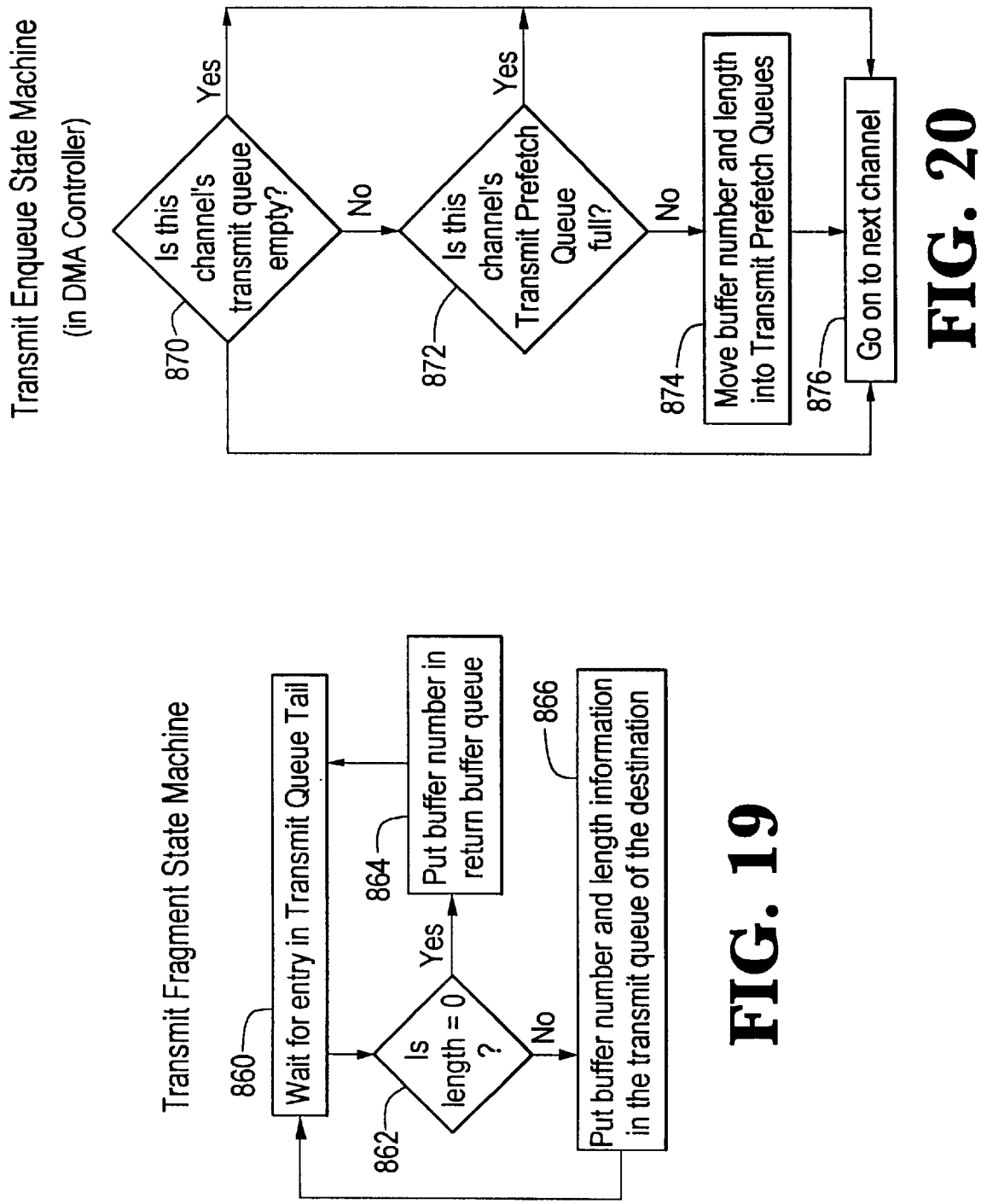

METHOD AND APPARATUS FOR INTERNETWORKING BUFFER MANAGEMENT

This is a Request for filing a continuation application under §1.53 (b) of prior application Ser. No. 08/501,355, filed Jul. 12, 1995 now U.S. Pat. No. 5,812,775 entitled: METHOD AND APPARATUS FOR INTERNETWORKING BUFFER MANAGEMENT.

FIELD OF THE INVENTION

The present invention relates to buffer management schemes for network gateways, and in particular to such schemes in which buffer allocation is optimized through static and dynamic buffer allocation.

BACKGROUND OF THE INVENTION

An internetwork device, such a bridge or router, provides the ability: 1) to receive a network message, or frame, over a network port; 2) to temporarily store the frame while required translation and reformatting is executed on the frame by the device; and 3) to retransmit the translated frame. Retransmission typically occurs over a network other than the one over which the frame was originally received. Commonly, such a device acts "promiscuously", which is to say that frames from each network interfaced by the device are received into memory. Frames destined for a port on the same network as received are normally dropped before being translated or otherwise processed by the device, while frames destined for another network are stored and reformatted/retranslated prior to transmission.

The memory resources employed by such internetworking devices to store frames are divided into buffers, typically on the order of 2048 bytes in size. While Ethernet frames are 1500 bytes in length and can therefore fit into one buffer, FDDI (fiber-distributed data interface) frames are on the order of 4500 bytes, thus requiring three buffers for complete storage.

Two approaches have been taken in managing the distribution of buffers among network ports within such devices. The first approach can be referred to as static buffer distribution, in which each one of the buffers in the device is distributed to a respective port. Thus, for example, in an internetworking device having sixteen ports and 2048 buffers, 128 buffers can be exclusively assigned to each port. The advantage of this approach is that each port is guaranteed to have a minimum number of buffers available to it at all times. A disadvantage lies in the "bursty" nature of network traffic, wherein a majority of these ports and their associated buffers are unused at any one time, while one or a few ports may have a great deal of traffic and may thus use up their supply of dedicated buffers.

In the other approach, referred to as dynamic buffer distribution, all of the buffers are located in a single common pool, such that any port requiring a buffer can choose one from the common pool. The advantage here is that any one port is not constrained by a small number of dedicated buffers, though a disadvantage lies in the unfair ability of one highly active port to block access to the common pool by other ports.

SUMMARY OF THE INVENTION

The present invention provides a method and apparatus for receiving and transmitting network frames via an internetworking device, the method and apparatus addressing the inefficiencies of the known buffer distribution approaches previously described while preserving a significant measure of the attendant advantages of each. Simply stated, a first portion of a total number of buffers is allocated among port-dedicated buffer pools, these buffers thus being available only to a specific, associated network port. A second portion of the total number of buffers is placed in a common pool accessible by any of the network ports. The distribution of dedicated buffers versus common pool buffers is preferably related to device heuristics and predicted device activity.

The present method involves receiving a frame over a first device port. By knowing which port received the frame, a list of buffers accessible only by that port is referenced and buffers not already used to store a frame or part thereof are identified. A second list of buffers in the common pool is referenced, and unused buffers assigned thereto are identified for use if insufficient unused buffer space is available in the buffers allocated specifically to the port in question. Frame data is then stored in the identified buffers. Once the frames have been manipulated prior to retransmission, internetworking device associated hardware initiates the transmission, including the release of the buffer(s) used to store the transmitted frame back to the port-dedicated and/or common buffer pool(s).

BRIEF DESCRIPTION OF THE DRAWINGS

These and other features of the present invention are more fully set forth below in the fully exemplary detailed description and accompanying drawings of which:

FIG. 19 is a flow chart representation of the operation of the Transmit Fragment State Machine;

FIG. 20 is a flow chart representation of the Transmit entry operation of the Transmit Enqueue State Machine;

DESCRIPTION OF THE PREFERRED EMBODIMENT

Figure 1:
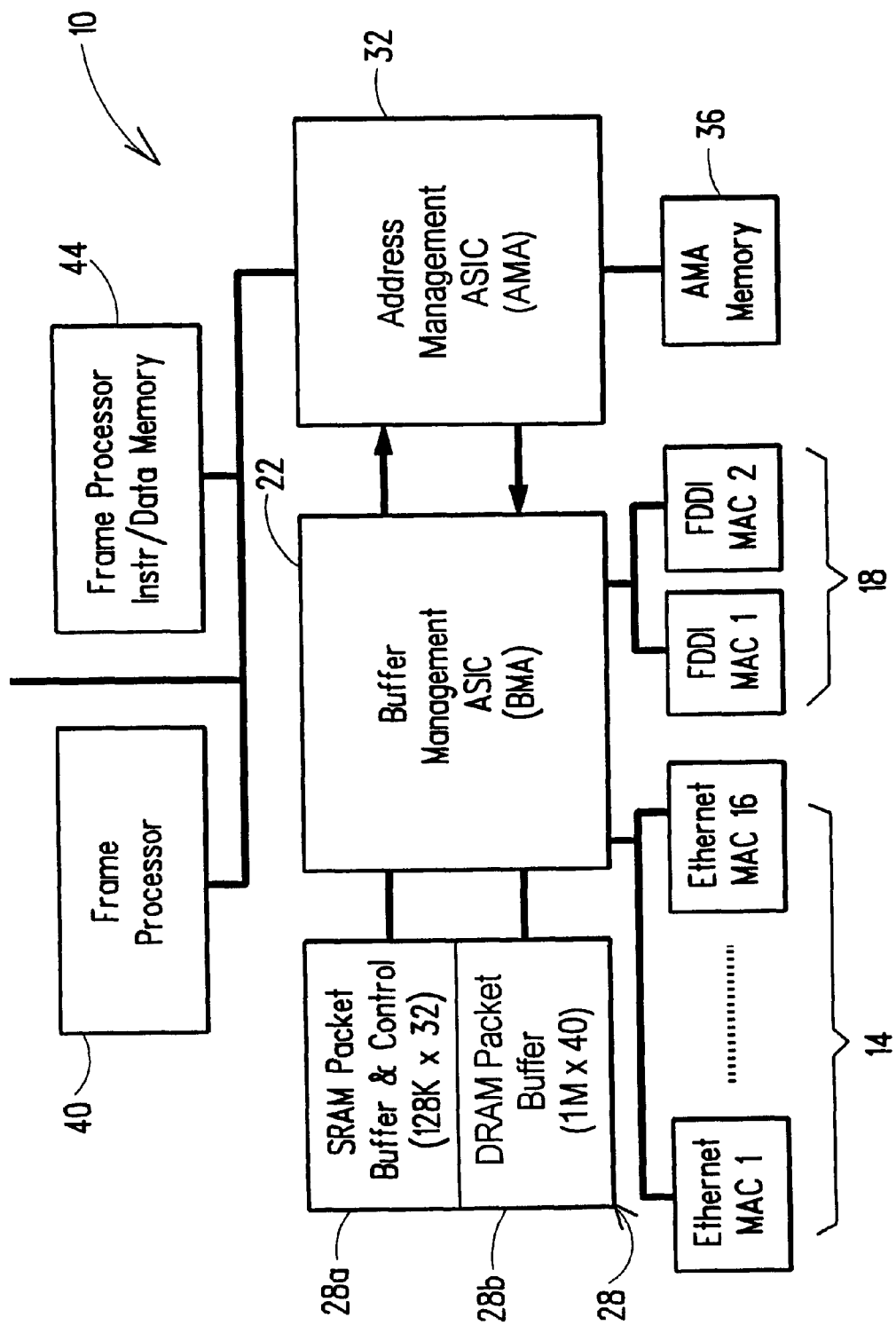
FIG. 1 is a block diagram of an embodiment of an internetworking device in accordance with the invention.

In brief overview and referring to FIG. 1, the presently disclosed internetworking device 10 includes a plurality of Ethernet Media Access Controllers (MACs) 14 (in one embodiment a total of sixteen) and one or more FDDI MACs 18 (in one embodiment a total of two). Each of the MACs provides a port for reception and transmission of data packets (frames) from/to the respective Ethernet or FDDI network (not shown). The network from which a data packet is received is referred to as a source network and the network to which a data packet is transmitted is referred to as a destination network. More specifically, the node attached to a network which from which a packet is received is referred to as a source node and the node to which a packet is transmitted is designated as a destination node. A data packet received from a source network by a MAC 14, 18 is stored in a buffer memory 28 under the control of a Buffer Management ASIC (BMA) 22 as described hereinafter. Illustrative internetworking devices 10 are bridges, or switches, which control packet communication based on data link layer information, and routers which control packet communication based on network layer information.

Figure 2:
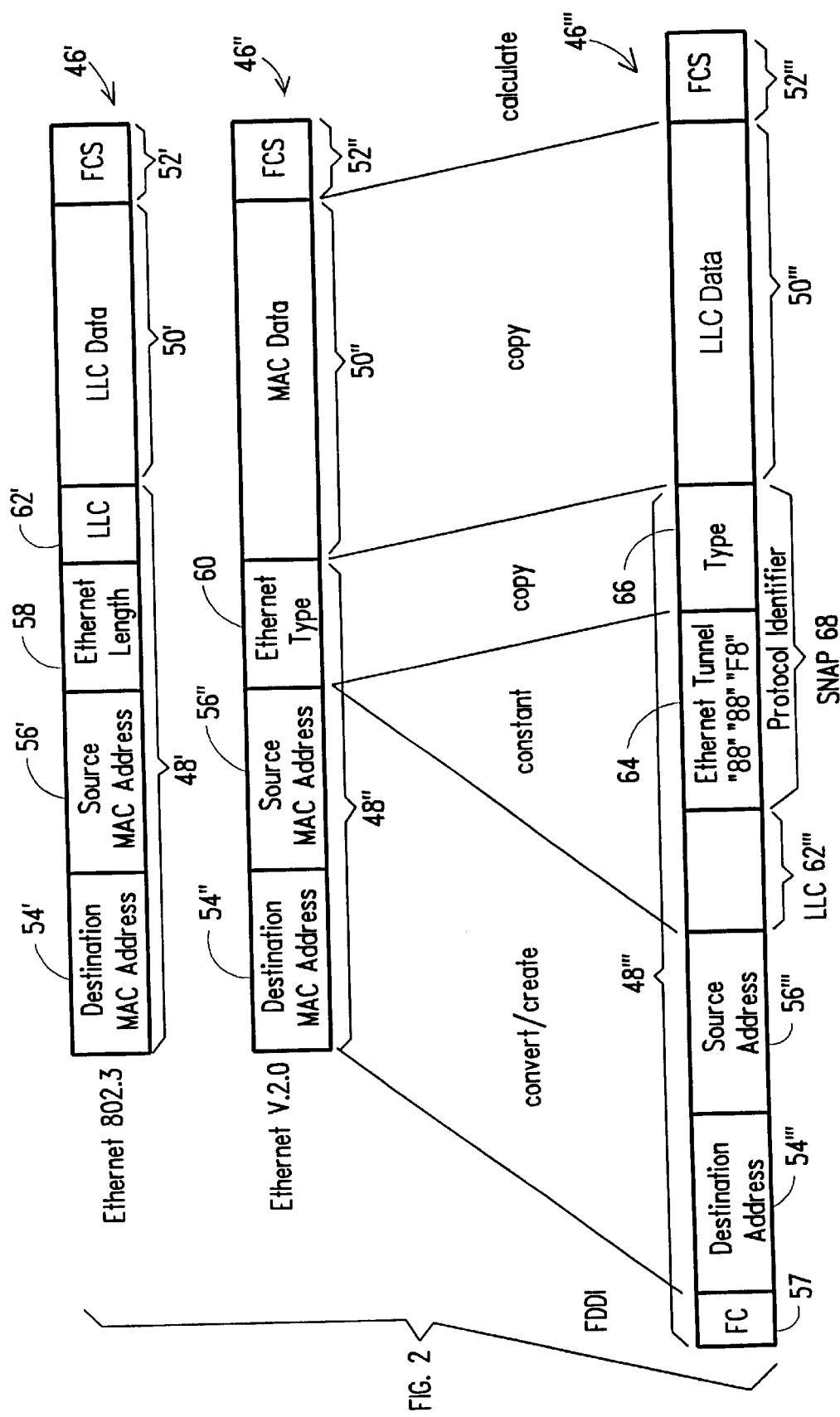
FIG. 2 shows the frame formats associated with Ethernet version 2.0, Ethernet 802.3, and FDDI networks.

Referring also to FIG. 2, the format of data packets (referred to hereinafter generally as 46) associated with an Ethernet 802.3 network (46'), an Ethernet version 2.0 network (46") and an FDDI network (46'''), respectively, is shown. Each of the data packets 46 includes a header portion, or packet header (referred to generally as 48), a data portion (referred to generally as 50), and a trailer portion (referred to generally as 52). More particularly, the Ethernet 802.3 packet 46' has a header 48', data 50' and a trailer 52', the Ethernet version 2.0 packet 46" has a header 48", data 50" and a trailer 52", and the FDDI packet 46''' has a header 48''', data 50''' and a trailer 52'''.

The header portion 48 of each of the data packets 46 includes a destination node address (referred to hereinafter generally as 54) and a source node address (referred to hereinafter generally as 56). The packet headers 48 further include network specific information. Specifically, the Ethernet 802.3 packet header 48' additionally includes a length field 58 and an LLC field 62'. The Ethernet version 2.0 packet header 48" additionally includes a type field 60. And the FDDI packet header 48''' additionally includes a frame control entry 57, preceding the destination address 54''', an LLC field 62''', an Ethernet tunnel field 64 and a type field 66, following the source address 56". The FDDI tunnel field 64 and type field 56 are only present in certain instances and are referred to collectively as a SNAP portion 68.

The data portion 50 of the respective frames contains the information to be transferred between the networks. In the case of the Ethernet 802.3 packet 46', the data field 50' sometimes includes an LLC field 72. The trailer 52 typically includes an error detection field, such as a Cyclic Redundancy Check (CRC) or Frame Check Sequence (FCS).

The BMA 22 sends the source address 56 and the destination address 54 of the packet 46, as well as other information, to an Address Management ASIC (AMA) 32 and causes the entire data packet 46 to be stored in one or more packet buffers, located in memory 28. The portion of buffer memory 28 used to store the respective packet is associated with the respective MAC 14, 18 receiving the data packet as hereinafter described.

Figure 6:
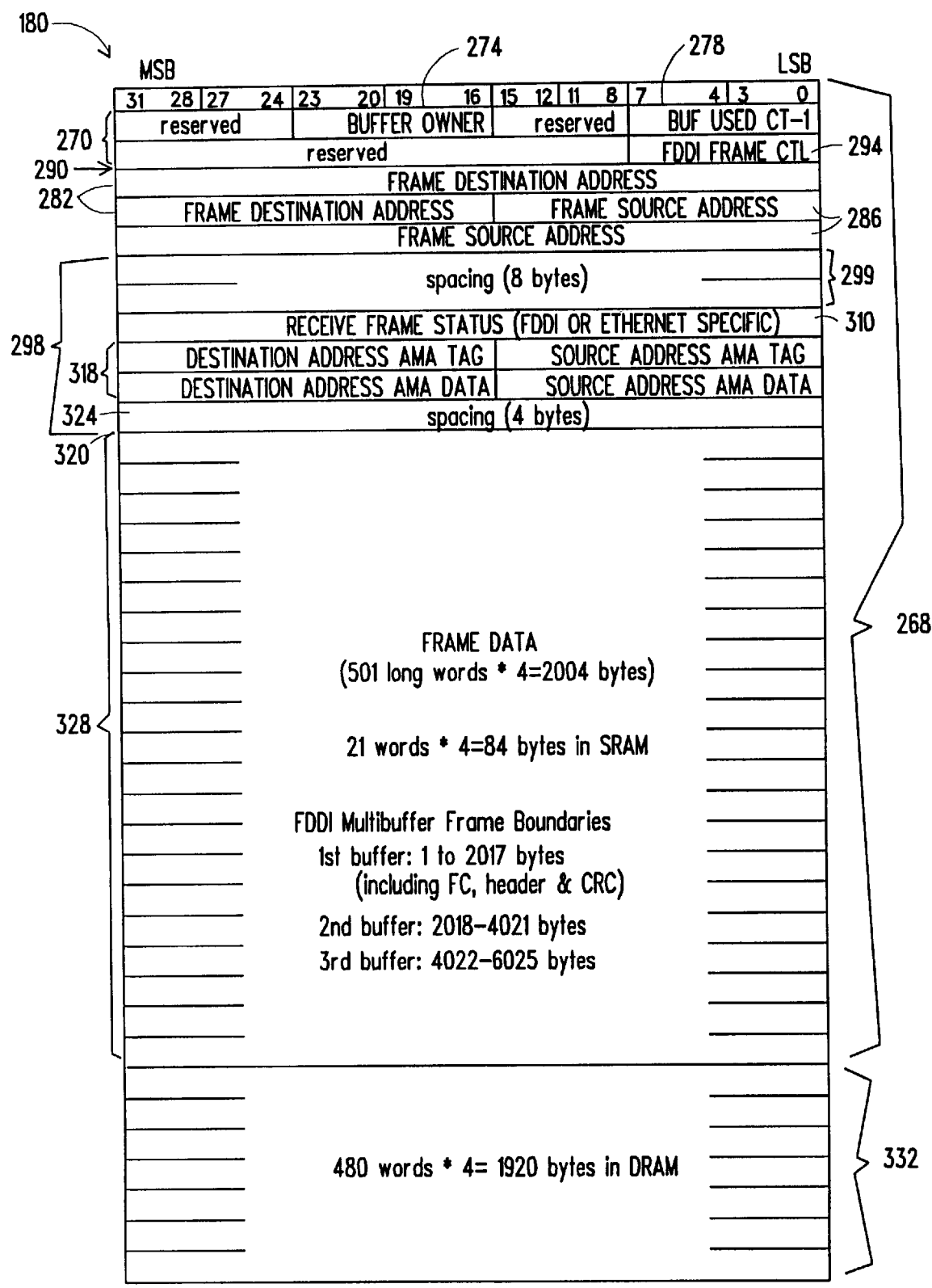
FIG. 6 is illustrative of the format of data stored in the buffer memory of FIG. 4A.

The first 96 bytes of a received Ethernet packet (or the first 97 bytes of a received FDDI packet) are stored in an SRAM portion 28a of memory 28 and any remaining bytes of the received packet are stored in a DRAM portion 28b of memory 28. After a predetermined number of bytes (which include the destination and source addresses) have been stored in SRAM 28a, a gap is "inserted" in the buffer memory 28 between the source address 56 and the remainder of the packet (as shown in FIG. 6 and described in detail below). That is, after the destination and source addresses are stored sequentially, the remaining portion of the received packet is stored beginning at a memory location separated from the last used buffer address so as to create a gap in memory 28. This gap is used by the device 10 to facilitate translation of the header 48 received from a source network when the packet must be reconfigured to a header format compatible with a destination network which differs from the source network, as described in the copending patent application entitled "Internetworking Device with Enhanced Header Translation and Memory" (Attorney Docket No. SYNER-105XX) filed on even date herewith and assigned to the assignee of the present invention and incorporated herein by reference.

The AMA 32 uses the information received from the BMA 22 to attempt to determine to which MAC 14, 18, (referred to also as port) the network associated with the destination node address of the received data packet is attached. The information may also be used by the AMA 32 either to learn of the existence of a source node which is not recognized by the AMA 32 or to determine that the source node of the data packet is an active node whose address should not be removed ("aged") from a table of node addresses located in AMA memory 36 as a result of inactivity.

The AMA 32 determines which MAC 14, 18 or port is to transmit the packet 46 by searching the address table in AMA memory 36. This table contains a list of known node addresses and additionally a designation for the respective MAC 14, 18 corresponding to each node address. The source address 56 is searched in the address table using a binary search technique. Likewise, the destination address 54 is searched in the address table using a binary search technique. The searches are conducted substantially simultaneously by interleaving the source address and destination address searches during alternate clock cycles, as described in a co-pending patent application entitled "Address Management for Internetworking Device" (Attorney Docket No. SYNER-106XX) filed on even date herewith and assigned to the assignee of the present invention and incorporated herein by reference.

Using information provided by the AMA 32, the BMA 22 generates, within a small number of clock cycles, a code vector which determines whether and how the received stored data packet 46 is to be processed by a frame processor unit (FPU) 40 and transmitted from the device 10, as is described in greater detail in a co-pending patent application entitled "Packet Characterization Using Code Vectors" (Attorney Docket No. SYNER-103XX) filed on even date herewith and assigned to the assignee of the present invention and incorporated herein by reference. For example, in the case where the received data packet 46 has a destination address 54 corresponding to a different type of network than the source network thereby requiring translation of the packet header 48, such as by the insertion of additional header information, a predetermined code vector is generated by the BMA 22. The predetermined code vector instructs the FPU 40 to execute a program stored in a frame processor memory 44 and to write the necessary header information into the gap in the buffer in which the received packet 46 is stored.

Conversely, if the received data packet 46 has a destination address 54 corresponding to the same type of network as the source network (and if certain other criteria are met), then another code vector is generated by the BMA 22. This code vector instructs the FPU 40 to execute code stored in frame processor memory 44 to begin transmitting the packet 46 to the destination address 54 before the packet 46 is entirely received by the device 10. The technique of beginning data transmission prior to the receipt of the entire packet 46 is referred to as cut-through. Cut-through is achieved without manipulation of the stored packet 46 by the FPU 40 and is described in detail in a co-pending patent application entitled "Method and Apparatus for the Concurrent Reception and Transmission of a Data Packet in an Internetworking Device" (Attorney Docket No. SYNER-104XX) filed on even date herewith and assigned to the assignee of the present invention and incorporated herein by reference.

Thus, the two above-described conditions result in the generation of two different code vectors by the BMA 22. In one embodiment, thirty-one different code vectors may be generated in response to thirty-one different states of the internetworking device 10 and received packet 46.

The code executed by the FPU 40 instructs the BMA 22 to enqueue a Transmit Queue entry on a Transmit Queue (FIG. 3), and then instructs the BMA 22 to transmit the packet 46 from the device 10 to the destination address 54. Once the Transmit Queue entry is enqueued, the FPU 40 can continue processing subsequent packets 46. After the data packet is transmitted by the respective MAC 14, 18 associated with the destination address 54, the buffer in which the packet 46 was stored may be returned and reused to store subsequent packets 46.

Figure 3:
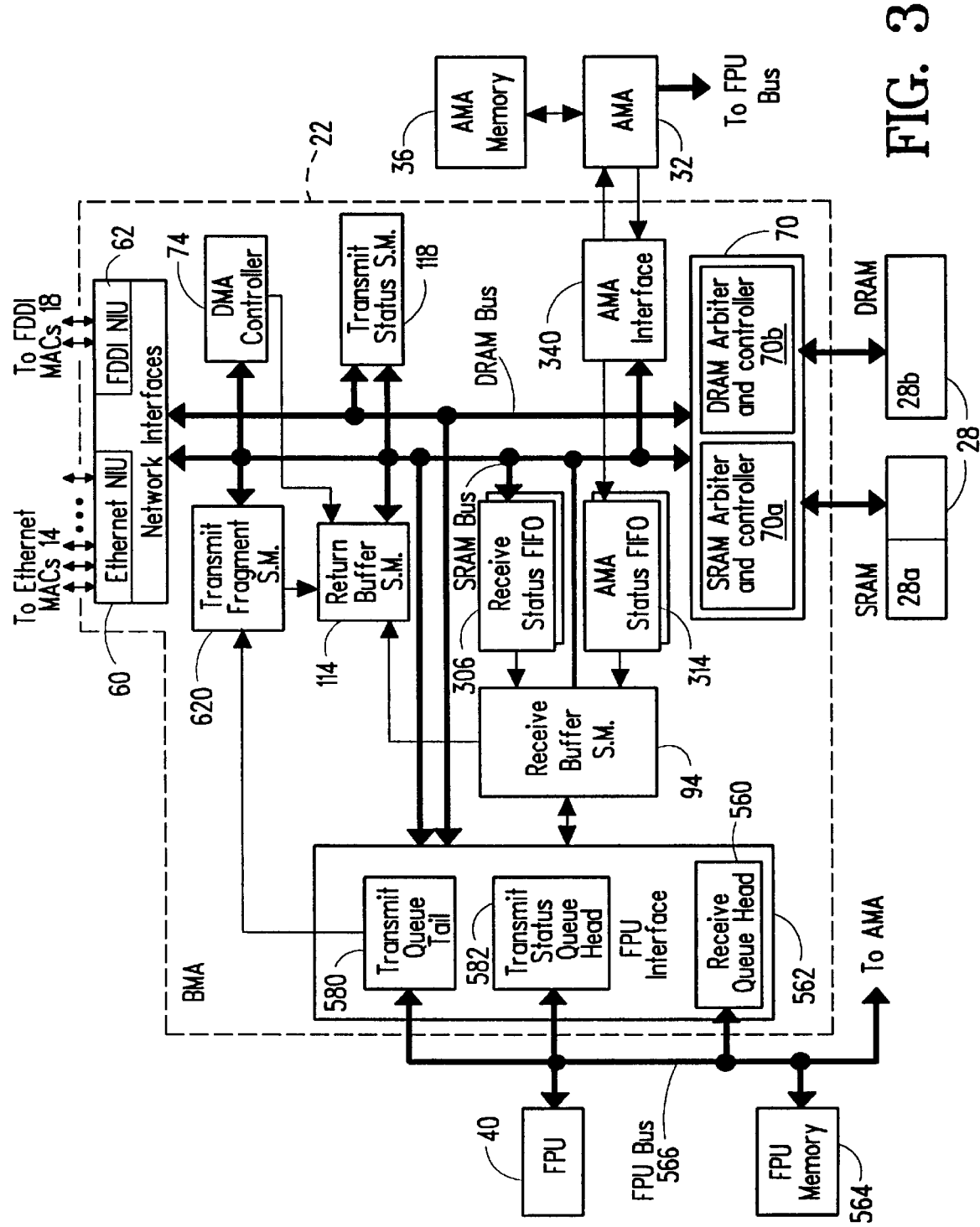
FIG. 3 is a further block diagram of the device of FIG. 1 showing an embodiment of the BMA in greater detail.

Referring to FIG. 3, a packet 46 received at a MAC 14, 18 from a source network is then passed to an associated Network Interface Unit (NIU) 60, 62, respectively. The Ethernet or FDDI NIU 60, 62 sends a request for memory access to a Direct Memory Access (DMA) controller 74. The DMA controller 74 channels the request to one of two arbiters and controllers 70a, 70b (forming an arbiter and controller pair 70) in accordance with whether the predetermined number of bytes to be stored in SRAM have been received. The arbiter pair 70 includes an SRAM arbiter and controller 70a and a DRAM arbiter and controller 70b, each in communication with a respective portion 28a, 28b of memory 28. Each arbiter/controller 70a, 70b grants access to the respective portion of memory 28 and notifies both the DMA controller 74 and the receiving NIU 60, 62 of the grant. The DMA controller 74 provides an address identifying an available buffer in the memory 28 and causes the packet 46 to be transferred from the NIU 60, 62 into the specified buffer.

Figure 4A:
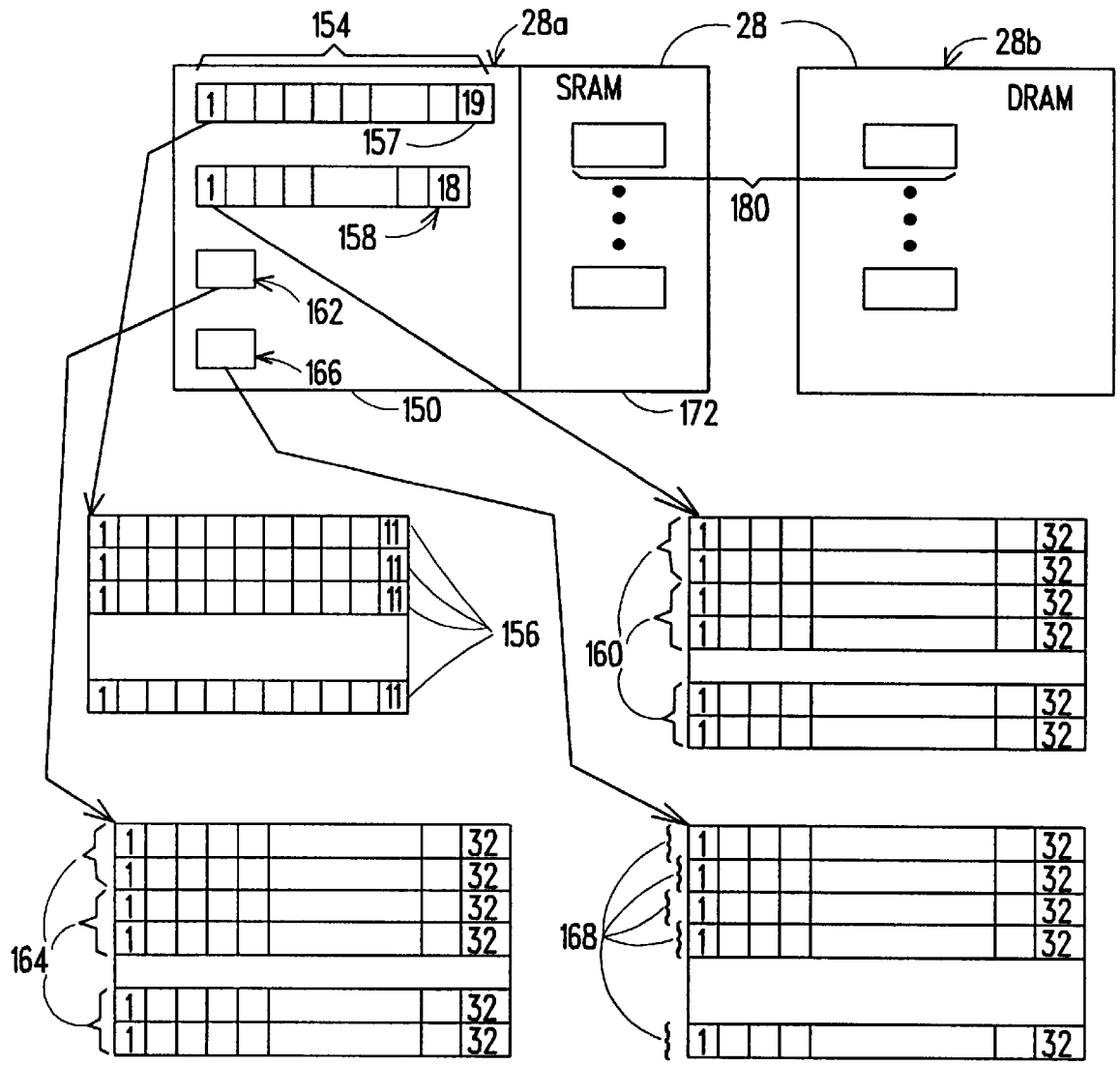
FIG. 4A shows an embodiment of the memory associated with the BMA in FIG. 3.

Referring also to FIG. 4A, the memory 28 includes an SRAM portion 28a and a DRAM portion 28b, as mentioned above. In one embodiment, the size of the SRAM portion 28a is 512 KB and the size of the DRAM portion 28b is 4 MB. Not all of the 4 MB DRAM portion is used however, since in the present embodiment the addresses of the SRAM are interleaved with addresses of the DRAM, as described below in conjunction with FIG. 4B. The SRAM 28a is divided into a control portion 150, including thirty-nine circular Queues 154, 157, 158, 162 and 166, and a buffer portion 172. The buffer portion 172 of SRAM 28a and the DRAM 28b provide buffers 180, some of which are assigned at system initialization to the MACs 14, 18. In one embodiment, the buffer portion 172 and DRAM 28b are divided into 2048 buffers 180.

Figure 4B:
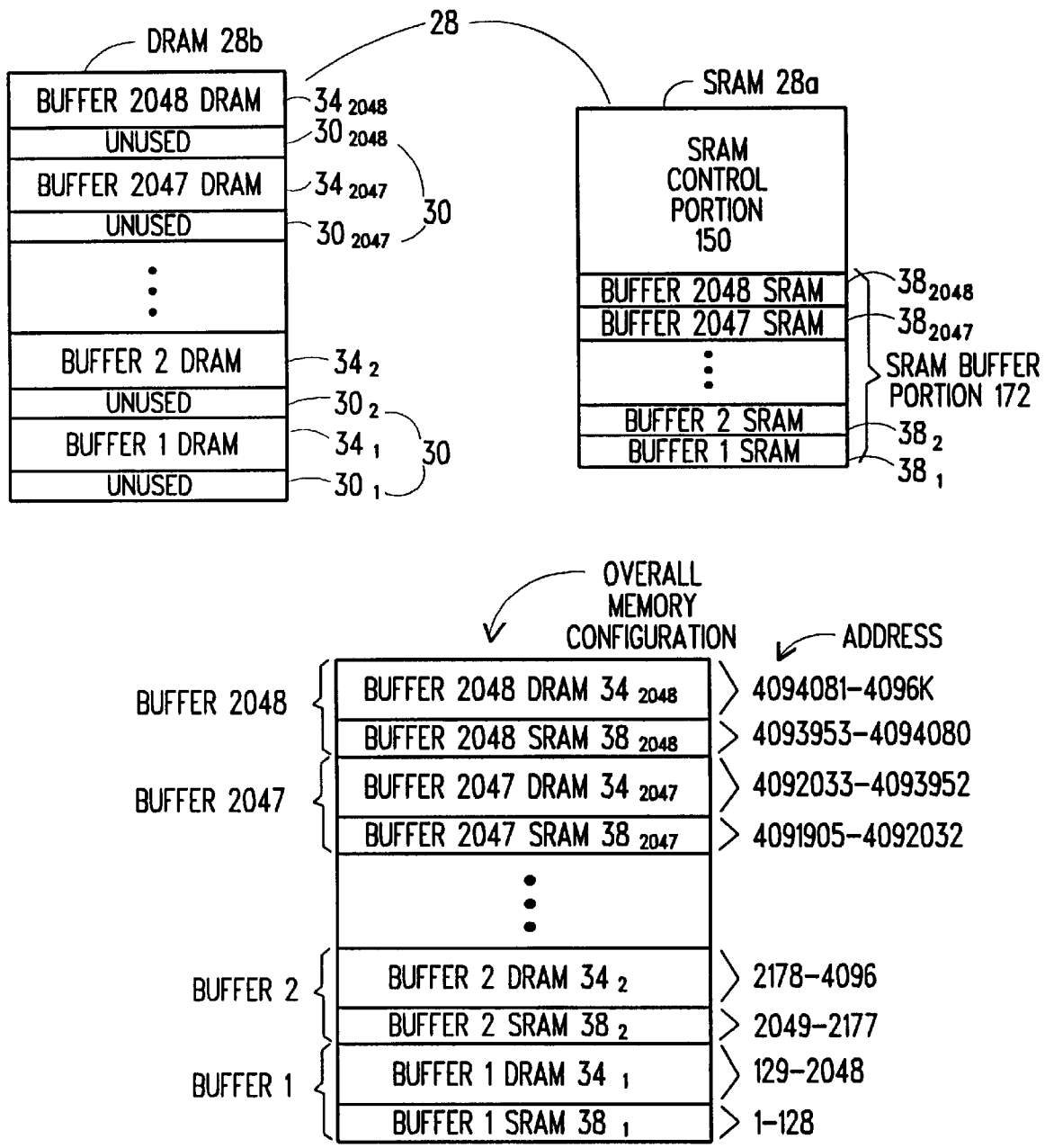
FIG. 4B shows the configuration of the individual SRAM and DRAM memory portions and the overall memory configuration interleaving portions of SRAM and DRAM.

Referring also to FIG. 4B, the configuration of SRAM and DRAM portions 28a, 28b of memory 28 are shown. As is apparent from the view of DRAM 28b in FIG. 4B, unused buffer portions $30_1$–$30_{2048}$ are interleaved with portions of DRAM that make up the buffers 180. Specifically, each unused DRAM portion $30_1$–$30_{2048}$ is 128 bytes in length and logically precedes a portion of DRAM $34_1$–$34_{2048}$ dedicated to a buffer. For example, the first unused block $30_1$ of DRAM precedes a portion $34_1$ of DRAM, with the unused portion $30_1$ and the portion $34_1$ providing the DRAM of the first buffer. Similarly, the last unused block $30_{2048}$ of DRAM precedes a portion $34_{2048}$ of DRAM associated with buffer number 2048. The buffer portion 172 of SRAM 28a (FIG. 4A) is divided into 2048 blocks $38_1$–$38_{2048}$, each 128 bytes long and associated with a respective one of the 2048 buffers.

Also shown in FIG. 4B is the overall memory configuration achieved by interleaving addresses of the SRAM portion 28a with addresses of the DRAM portion 28b. More particularly, the overall memory configuration has sequential addresses, which correspond to blocks of SRAM 28a interleaved with blocks of DRAM 28b. In the illustrative embodiment, the first 128 bytes of memory, at addresses 1–128, correspond to the first 128 bytes of the SRAM buffer portion 172 (i.e., portion $38_1$). The second block of memory, from addresses 129–2048, corresponds to the DRAM buffer portion $34_1$. Together the SRAM portion $38_1$ and the DRAM portion $34_1$ provide buffer 1. The SRAM and DRAM portions $38_1$–$38_{2048}$, $34_1$–$34_{2048}$ are interleaved in this manner to provide buffers 1 through 2048, as shown in the overall memory configuration of FIG. 4B.

At system initialization, a predetermined number of buffers are assigned to each MAC 14, 18 under program control in a manner described below. Specifically, in one embodiment 64 buffers are assigned to each MAC 14, 18. The remaining buffers 180 are assigned to a common pool of buffers which may be used in the event a MAC 14, 18 has used all of its preassigned buffers. A portion of this common pool can be reserved for use by the FPU 40. In one embodiment, the distribution of such buffers is determined at initialization. In another embodiment of the present invention, the distribution of such buffers between MACs 14, 18 and the common pool of buffers is adjusted actively according to measured network activity.

Each buffer 180 includes locations in buffer portion 172 of SRAM 28a and locations in DRAM 28b, as will be discussed below in conjunction with FIG. 6. The packets 46 are stored in buffers 180 so as to ensure that, in cases where it is necessary for the memory 28 to be accessed for purposes of header translation, it is the SRAM portion 172 of the buffer 180 that is accessed. Since SRAM has shorter access times than DRAM, requiring memory accesses to be to SRAM advantageously reduces header translation time, as described in the copending patent application entitled "Internetworking Device with Enhanced Header Translation and Memory" (Attorney Docket No. SYNER-105XX) filed on even date herewith and assigned to the assignee of the present invention and incorporated herein by reference.

Referring to the control portion 150 of the SRAM 28a, nineteen of the thirty-nine circular queues are referred to as Free Buffer Queues (generally labelled 154, 157); eighteen of the queues are Transmit Queues (generally labelled 158); one queue is a Receive Queue 162 and one queue is a Transmit Status Queue 166 containing transmit status information provided by a Transmit Status State Machine (TSSM) 118 in the BMA 22 shown in FIG. 3.

Each of the Free Buffer Queues 154, 157 contains a list of unused buffers 180. The first eighteen Free Buffer Queues 154 correspond to the eighteen MACs 14, 18 and contain lists of buffers 180 available only to the respective MAC 14, 18. In the illustrative embodiment in which each of the MACs initially has sixty-four unused dedicated buffers, each of the Free Buffer Queues 154 contains sixty-four entries 156. The Free Buffer Queue entries 156 contain the eleven bit address of the respective buffer 180 in memory 28. In the same illustrative embodiment, the eleven bit entries enable addressing 2048 buffers. The nineteenth Free Buffer Queue 157 is a common Free Buffer Queue which lists buffers which may be used by any of the MACs 14, 18 in the event that the supply of buffers originally assigned to the per port Free Buffer Queues 154 is exhausted.

Each of the eighteen Transmit Queues 158 is associated with a corresponding one of the MACs 14, 18 and contains entries corresponding to packet transmissions enqueued by the FPU 40 for processing by the respective MAC 14, 18. More particularly, the Transmit Queues 158 are configurable to between 0 and 1500 entries deep, with each entry 160 comprising two, thirty-two bit words, as shown. In one embodiment, each Transmit Queue 158 is 500 entries deep. The content of the transmit entries 160 will be described further in conjunction with FIG. 14a and 14b.

The Receive Queue 162 contains entries 164 corresponding to packets 46 received by the device 10 for processing by the FPU 40. The Receive Queue 162 is configurable to between 0 and 4096 entries deep, with each entry 164 comprising two, thirty-two bit words. In one embodiment, the Receive Queue 162 is 4096 entries deep. The format of the Receive Queue entries 164 will be described below in conjunction with FIGS. 12a and 12b.

The Transmit Status Queue 166 contains an entry 168 for each packet 46 that has been transmitted from the internetworking device 10 in error. More particularly, the transmit status entries 168 indicate which error(s) occurred in the transmission of the corresponding packet 46 from the device 10. The Transmit Status Queue 166 is configurable to between 0 and 4096 entries deep, and, in one embodiment is 2048 entries deep, with each entry 168 being one, thirty-two bit word.

Figure 5:
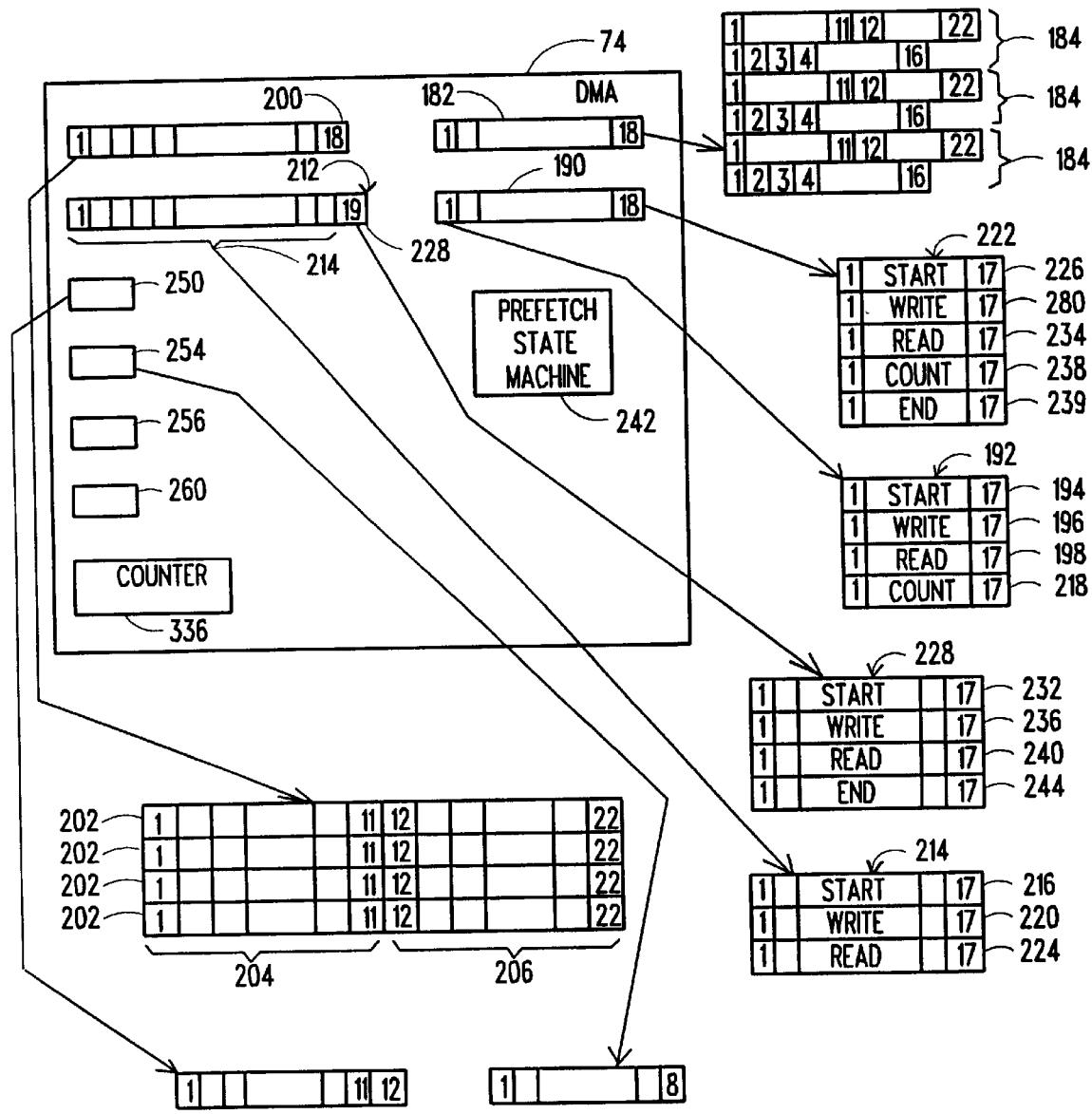
FIG. 5 shows the DMA controller of FIG. 3 in greater detail.

Referring also to FIG. 5, the DMA controller 74 includes eighteen Free Buffer Prefetch Queues 200, corresponding to the eighteen MACs 14, 18. Each queue contains four prefetch entries 202 received from a respective Free Buffer Queue 154 in memory 28. More particularly, the prefetch queue entries 202 include the address of buffers available to the respective MAC 14, 18, as will be described.

With this arrangement, the DMA controller 74 is able to allocate an incoming packet 46 to a buffer 180 quickly, without having to access the respective Free Buffer Queue 154 in the SRAM control portion 150 (FIG. 4A). Each entry 202 of the Free Buffer Prefetch Queues 200 is twenty-two bits long, with the first eleven bits 204 providing the address of the available buffer and the second eleven bits 206 providing a body offset pointer (i.e., a pointer to the buffer location following the gap). The first eleven bits 204 are taken from the respective Free Buffer Queue 154, and the second eleven bits 206 are taken from a Body Offset Register 260 of the DMA controller 74 (discussed below).

The DMA controller 74 further contains nineteen Free Buffer Queue Control Blocks (QCBs) 212. Each of the nineteen QCBs 212 corresponds to one of the nineteen Free Buffer Queues 154, 157 (FIG. 4A) in the SRAM control portion 150. The QCBs 212 maintain pointers to the Free Buffer Queues 154, 157, with one of the pointers indicating the next available buffer 180 in the queues 154, 157 for storing incoming packets 46. Thus, when one of the entries 202 in a Free Buffer Prefetch Queue 200 is used (i.e., is assigned to store an incoming packet 46), the DMA controller 74 prefetches the address of the next available buffer within the respective Free Buffer Queue 154 based upon the current pointers in the respective QCB 212. Alternatively, if there are no available buffers remaining in the respective Free Buffer Queue 154, then the DMA controller 74 prefetches the next available buffer within the common Free Buffer Queue 157. Then, the DMA controller 74 adjusts the pointers in that QCB 212 to reflect the use of the prefetched buffer.

To this end, each of the first eighteen Free Buffer QCBs 214 contains three pointers, a START pointer 216, a WRITE pointer 220, and a READ pointer 224. The nineteenth Free Buffer QCB 228 contains four pointers, a START pointer 232, a WRITE pointer 236, a READ pointer 240, and an END pointer 244. Each of the pointers in the QCBs 212 is seventeen bits long, corresponding to an address in the control portion of SRAM where the Free Buffer Queue 154, 157 resides. While the first eighteen QCBs 214 do not contain END pointers 244, the function of the END pointer 244 (i.e., to indicate when the WRITE pointer 236 and the READ pointer 240 are to loop back to the head of the respective Free Buffer Queue 154) is provided by the START pointer 216 of the next sequential QCB 214, 228.

At initialization, the START pointer 216, 232 and the WRITE pointer 220, 236 of each QCB 214, 228, respectively, point to the first location in the respective Free Buffer Queue 154, 157, which after initialization contains the address of the first buffer associated with the respective port. The READ pointer 224, 240 indicates the location preceding the location at which the address of the next buffer to be returned after use is written. The END pointer 244, in the nineteenth QCB 228, points to the last buffer in the common Free Buffer Queue 157.

The START pointer 216, 232 is fixed at the first entry in the respective Free Buffer Queue 154, 157. The WRITE pointer 220, 236 is incremented during operation, as buffers in the Free Buffer Queues 154, 157 are assigned to incoming packets 46. The READ pointer 224, 240 is incremented during operation as buffers are returned to their respective Free Buffer Queues 154, 157 after use. The END pointer 244 is fixed at the last buffer in the common Free Buffer Queue 157.

When the WRITE pointer 220, 236 points to the same location as the END pointer 244 (or equivalently, the START pointer 216 of the next sequential QCB 214), the WRITE pointer 220, 236 is incremented to the location of the fixed START pointer 216, 232, so as to cause the WRITE pointer 220, 236 to "loop back" to the beginning of the buffer list, thereby treating this list as a circular queue. Likewise, when the READ pointer 224, 240 points to the same location as the END pointer 244 (or to the START pointer 216 of the next sequential QCB 214), the READ pointer 224, 240 is incremented to the location of the fixed START pointer 216, 232, causing the READ pointer 224, 240 to "loop back" to the beginning of the buffer list.

The transmission components of the DMA controller 74 somewhat mirror the buffer allocation components in that, the DMA controller 74 contains eighteen Transmit Prefetch Queues 182, corresponding to the eighteen MACs 14, 18. Each Transmit Prefetch Queue 182 contains three entries 184. A Transmit Prefetch Queue entry 184 consists of a twenty-two bit buffer address and a sixteen bit control and length word. The control and length word consists of three control bits and a thirteen bit packet length field. The control bits indicate "cut-through", "end of frame", and "do not free buffer". The two words of each Transmit Prefetch Queue entry 184 correspond to an entry 160 (FIGS. 14a and 14b) in a Transmit Queue 158.

The DMA controller 74 additionally includes eighteen Transmit QCBs 190, each likewise corresponding to one of the eighteen MACs 14, 18. The first seventeen Transmit QCBs 192 contain a COUNT field 218 and three pointers: a START pointer 194, a WRITE pointer 196, and a READ pointer 198. The START, READ, and WRITE pointers are as described above in conjunction with the Free Buffer QCBs 212. The COUNT field 218 maintains a count of transmitted Transmit Queue entries 184. The last Transmit QCB 222 contains five pointers: a START pointer 226, a WRITE pointer 280, a READ pointer 234, a COUNT pointer 238 and an END pointer 239. The END pointer 239 functions as described above in conjunction with the nineteenth Free Buffer QCB 228. Each Transmit QCB pointer is seventeen bits long, corresponding to an address in the control portion of SRAM where the Transmit Queue 158 resides.

When a Free Buffer Prefetch Queue 200 contains less than four entries 202, a Free Buffer Enqueue State Machine 630 of Prefetch State Machine 242 prefetches the address of the next available buffer within the respective Free Buffer Queue 154, 157 in response to the pointers in the Free Buffer QCBs 212. Similarly, when a Transmit Queue 182 contains less than three entries 184, a Transmit Enqueue State Machine 640 of Prefetch State Machine 242 prefetches the next entry within the respective Transmit Queue 158 in response to the Transmit QCBs 190.

Figure 15:
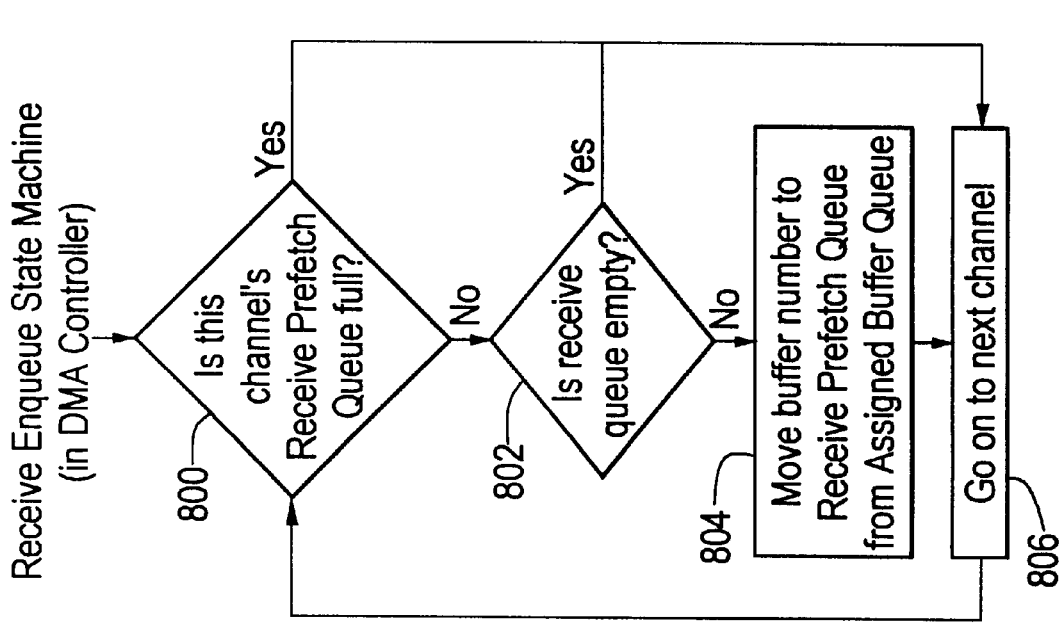
FIG. 15 is a flow chart representation of the Free Buffer operation of the Free Buffer Enqueue State Machine.

More particularly and as illustrated in FIG. 15, the Free Buffer Enqueue State Machine 630 sequentially checks each of the eighteen Free Buffer Prefetch Queues 200 to verify that four buffer addresses have been loaded from the respective Free Buffer Queue 154 (step 800). If not, the State Machine 630 checks to see whether or not the Free Buffer Queue 156 for the particular channel is empty (step 802). If the respective Free Buffer Queue 156 is empty, then the Free Buffer Enqueue State Machine 630 proceeds to the Common Free Buffer Queue 157. If the Common Free Buffer Queue 157 is empty, there are no free buffers available for this channel and the Free Buffer Enqueue State Machine proceeds to the next channel (steps 803, 806). If the respective Free Buffer Queue 156 is not empty, then the next buffer number from the Free Buffer Queue 156 is moved into the Free Buffer Prefetch Queue 200 (804). If the respective Free Buffer Queue 156 is empty but the Common Free Buffer Queue is not empty (steps 802, 803), then the next buffer number from the Common Free Buffer Queue 156 is moved into the Free Buffer Prefetch Queue 200 (804). Thereafter, the Free Buffer Enqueue State Machine 630, proceeds the next channel (step 806).

In operation and considering illustrative Free Buffer QCB 214, initially, the START and WRITE pointers 216, 220 point to the first location of the respective Free Buffer Queue 154 and the READ pointer 224 points to the last entry in the respective Free Buffer Queue 154. When the associated Free Buffer Prefetch Queue 200 becomes not full, the DMA controller 74 reads the address of the buffer pointed to by the WRITE pointer 220 and writes it into the next available location in the Free Buffer Prefetch Queue 200. Thereafter, the WRITE pointer is incremented by one.

Conversely, once use of a buffer is completed and the buffer is returned to the respective Free Buffer Queue 154, the address of the buffer to be returned is written into the location of the Free Buffer Queue 154 subsequent to the location pointed to by the READ pointer 224. Thereafter, the READ pointer is incremented by one.

Recall that the Free Buffer Queues 154, 157 contain sixty-four entries 156 each. However, each of the Free Buffer Queues 154, 157 contains an additional location which is used to indicate whether the Free Buffer Queues 154, 157 are empty or full. When the WRITE pointer 220 and the READ pointer 224 are separated by one queue entry, then the respective Free Buffer Queue 154, 157 is full (i.e., no buffers have been used and all are available), such as in the initialized state. When the WRITE pointer 220 points to the same location as the READ pointer 224, the respective Free Buffer Queue 154, 157 is empty (i.e., there are no more assigned buffers available for receiving incoming packets). When the Prefetch State Machine 242 attempts to "fetch" a buffer and determines that there are no more available buffers assigned to the respective MAC 14, 18, then the Prefetch State Machine looks to the last Free Buffer Prefetch QCB 228 associated with the common Free Buffer Queue 157 to fetch a buffer address.

Figure 16:
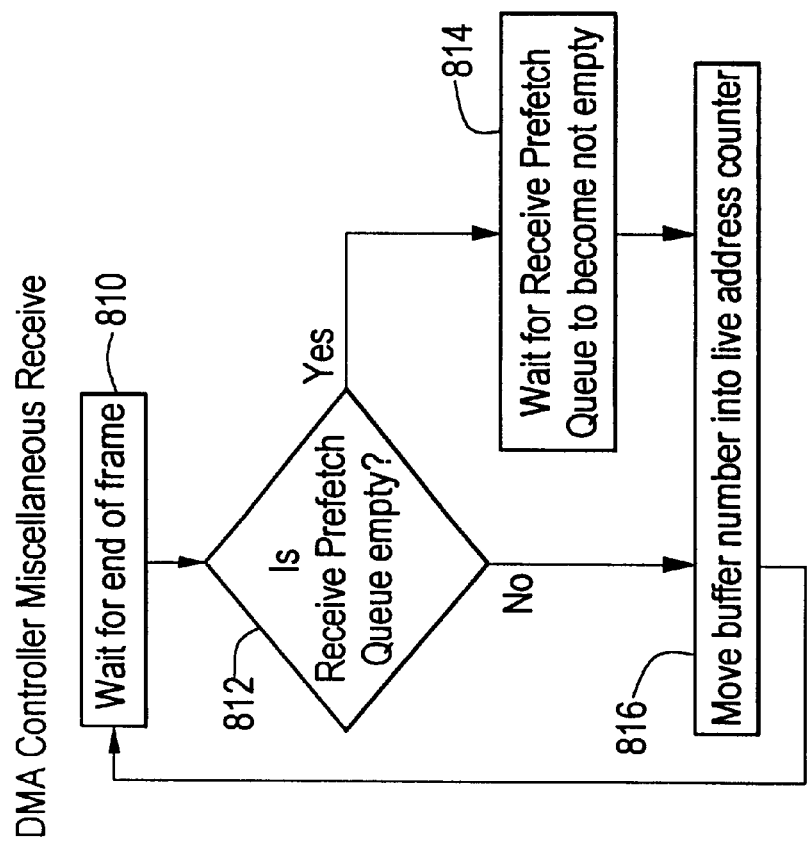
FIG. 16 is a flow chart representation of the live address counter operation of the Free Buffer Enqueue State Machine.

The DMA controller 74 also includes Receive live address counters 632 associated with each of the eighteen Free Buffer Prefetch queues 200. While the Prefetch queues 200 contain buffer addresses available for receipt of incoming frames, providing the next available buffer address in a live address counter 634 simplifies the ability to mathematically manipulate the address stored in the counter 634 during frame storage. Each Receive live address counter 634 is twenty-two bits long, providing eleven bits of available buffer address and eleven bits for the body offset pointer. The transfer of a Free Buffer Prefetch Queue Entry 202 into the live address counter 634 is reflected in FIG. 16. Since each live address counter 634 is loaded from a respective Free Buffer Prefetch Queue entry 202, the former cannot be updated without entries in the latter (steps 812, 814, 816). Once again, the Free Buffer Enqueue State Machine 630 is responsible for keeping the Free Buffer Prefetch queues 200 filled, as shown in FIG. 15.

The DMA controller 74 further includes two registers 250, 254 dedicated to allocating buffers 180 from memory 28 for use by the FPU 40 for network management purposes. The first such register is an FPU Available Buffer register 250 which includes the address of the next available buffer from the common Free Buffer Queue 157 for use by the FPU 40. The FPU Available Buffer register 250 is twelve bits wide. The first eleven bits are buffer address bits. The twelfth bit indicates whether the first eleven bits are valid or invalid.

The first eleven bits are valid when they contain a buffer address and are invalid when they are in an undefined state because the register 250 is being replenished by the Prefetch State Machine 242. The second such register is an FPU Buffer Reserve Count register 252 which specifies how many buffers 180 are reserved for use by the FPU 40. This number is initialized by the FPU 40.

A Header Offset Register 256 is provided in the DMA controller 74 for each buffer 180 and stores the first address in the respective buffer at which the destination address 54 of the packet header 48 is stored. Similarly, a Body Offset register 260 is provided in the DMA controller 74 for each buffer 180 and stores a pointer to the first location in the respective buffer after the header and gap.

An illustrative packet buffer 180 from one of the Free Buffer Queues 154, 157 is shown in FIG. 6 to have a length of 2048 bytes. The first 128 bytes of the buffer 180 are located in the buffer portion 172 of SRAM 28a (FIG. 4A) and provide an SRAM storage area 268 of the buffer 180, while the remaining 1920 bytes of the buffer 180 are located in the DRAM 28b and provide a DRAM storage area 332. A first predetermined number of bytes of the buffer 180 (i.e., the control storage area 270) are reserved for buffer control information, including a Buffer Owner field 274 and a Buffer Used Count field 278. In the illustrative embodiment, the control storage area 270 is seven bytes in length.

The Buffer Owner field 274 identifies the Free Buffer Queue 154, 157 in which the buffer 180 is listed. This field 274 is used in the releasing of the buffer 180 after the last transmission of a packet 46 contained therein. Upon initialization, an identifier is written into the Buffer Owner field 274, identifying which of the MACs 14, 18 is assigned the particular buffer 180. With this arrangement, when it is time to return the buffer 180, a Return Buffer State Machine 114 (FIG. 3) can associate the buffer 180 with a particular MAC 14, 18. A value of 0–17 in the Buffer Owner field 274 indicates that the buffer 180 is assigned to a Free Buffer Queue 154 associated with one of the MACs 14, 18. A Buffer Owner field 274 having the value of 255 indicates that the buffer 180 is assigned to the common Free Buffer Queue 157. Buffer Owner field values of 18–253 indicate that the packet buffer 180 is reserved for network port expansion. Finally, a Buffer Owner field 274 with a value of 254 indicates that the packet buffer 180 is permanently allocated to the FPU 40, and is never to be returned.

The Buffer Used Count field 278 is also used in the return of the buffer 180 after the last transmission of a packet stored therein and, specifically, indicates whether the buffer 180 should be returned for reuse. The Buffer Used Count field 278 contains a value indicating the number of times the buffer 180 is to be transmitted before the buffer is returned. The Buffer Used Count field 278 is used primarily for multicast transmissions, where data from a single buffer is transmitted by multiple ports before the buffer is returned, as described below in conjunction with FIG. 13.

The source 56 and destination 54 addresses of the packet header 48 are read into an address header storage area, including a destination address field 282 and a source address field 286 of the buffer 180. In the illustrative embodiment, the address header storage area contains twelve bytes, for storing the six bytes of destination address 54 and the six bytes of source address 56. A configurable header offset pointer 290, stored in the Header Offset Register 256 of the DMA controller 74, defines the starting location of the destination address field 282 within the buffer 180. Thus, the position of the destination 54 and source 56 addresses within the buffer 180 is always the same, regardless of packet type. The header offset pointer 290 is selected so as to leave a one byte location preceding the destination address field 282 (i.e. the FDDI frame control field 294) for storage of a frame control entry 57 (FIG. 2) associated with an FDDI packet 46'''. Thus, in a buffer 180 assigned to an FDDI MAC 18, the frame control entry 57 is stored in the FDDI frame control field 294 preceding the destination address storage field 282.

A predetermined number of bytes of the SRAM storage area 268, following the source address field 286, are reserved for the translation gap 298. This gap 298 is reserved for the addition of translation bytes (i.e., bytes which may be overwritten by the FPU 40 for the purpose of translating the packet 46 from one network format to another). This reserved space within the buffer 180 permits the FPU 40 to perform translation without having to relocate or move either the packet header 48 or data 50 within the buffer 180. In the present embodiment, the translation gap 298 is twenty-four bytes in length.

Figure 9A:
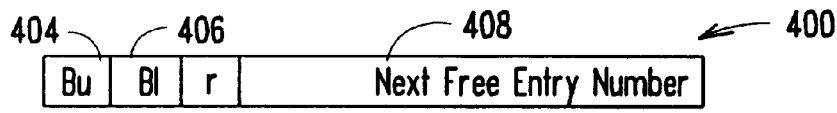
FIGS. 9a and 9b depict an illustrative data format for the AMA Status FIFO.
Figure 9B:
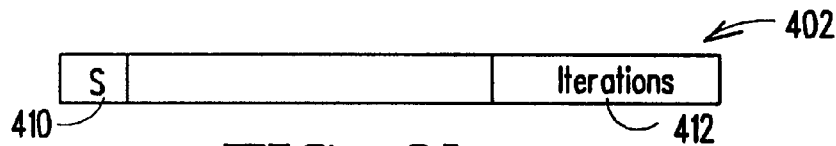
Figure 10A:
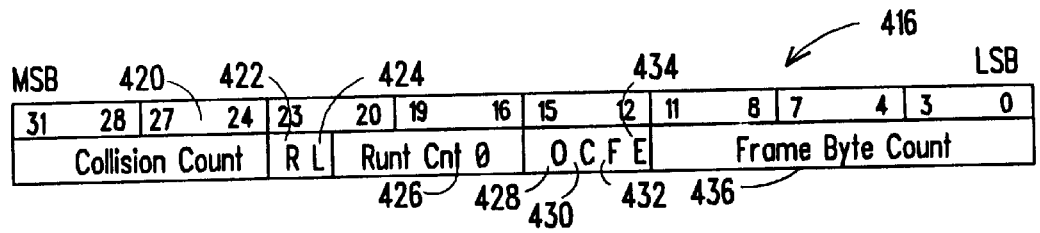
FIGS. 10a and 10b show an illustrative data format for the Receive Status FIFO (for both the Ethernet and FDDI networks)
Figure 10B:
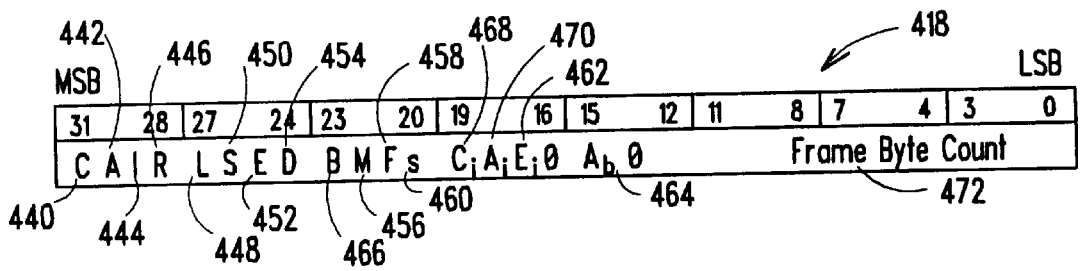

Receive status, provided by a Receive Status FIFO 306 (FIG. 3) and described below in conjunction with FIGS. 10a and 10b, is temporarily stored in a receive status field 310 of the buffer 180, within the translation gap 298. Information provided by an AMA Status FIFO 314 and described below in conjunction with FIGS. 7–9b, is stored in an AMA field 318 of the buffer 180, immediately following the receive status field 310.

A configurable body offset pointer 320 stored in the Body Offset Register 260 in the DMA controller 74 points to a predetermined number of words beyond the AMA field 318. In the buffer 180 shown, the body offset pointer 320 is spaced from the end of the AMA field 318 by four bytes.

The remainder of the received packet 46, including the data 50, is stored starting in the remainder of the SRAM portion 172, referred to as the after gap storage area 328. If the packet 46 requires more than the eighty-four bytes available in the after gap storage area 328, the remainder of the packet 46 is read into the DRAM storage area 332 of the buffer 180 located in the DRAM portion 28b of memory 28.

Upon receiving a packet 46, the DMA controller 74 assigns a buffer 180 to the received packet 46 from the respective Free Buffer Prefetch Queue 200 (FIG. 5). Thereafter, the destination 54 and source 56 addresses of the packet 48 header are written into the destination address field 282 and the source address field 286 of the buffer 180, beginning at the header offset pointer 290. A counter 336 located in the DMA controller 74 (FIG. 5) counts the first twelve bytes of the received packet in the case of an Ethernet source node or the first thirteen bytes in the case of an FDDI source node, based upon the type of port (FDDI or Ethernet) receiving the packet 46.

Once the appropriate count occurs, the DMA controller 74 increments the address in the SRAM storage area 268 to which the packet 46 is being transferred to the body offset pointer 320. In the illustrative embodiment, the SRAM address is incremented by twenty-four bytes, corresponding to an eight byte space 299, the four byte receive status field 310, the eight byte AMA field 318, and the four byte space 324. The remainder of the packet 46 is then written into the buffer 180 starting at the body offset pointer 320. If the packet 46 exceeds the eighty-four bytes available in the after gap storage area 328, then the remainder of the packet 46 is written to the DRAM storage area 332.

The twelve bytes of the received packet 46, which include the source 56 and destination 54 addresses for the packet 46, are written not only to the buffer 180 as described above, but also through an AMA interface 340 (FIG. 3) to the AMA 32. While the packet 46 is being stored in memory 28, the AMA 32 searches the address table in the AMA memory 36 for the source 56 and destination 54 addresses contained in the packet 46.

The FPU 40 issues commands to the AMA 32 and receives command results from the AMA 32 through a direct processor interface. The AMA's response to the FPU's command is reported to the FPU 40 in two, sixteen bit words 400, 402 (FIGS. 9a and 9b). The highest order bit (Bu) 404 of the first word 400 (FIG. 9a) indicates whether the AMA 32 is presently busy and is executing the last issued command. Bit 14 (Bl) 406 indicates that the AMA 32 is currently blocked and is copying command data in preparation for executing a command. Bits twelve through zero 408 are the address of the next free entry 344 in the AMA memory 36.

The highest order bit (S) 410 of the second word 402 (FIG. 9b) returns the status result of the last command executed by the AMA 32. Whether the bit is set or cleared depends upon the command executed. Bits three through zero 412 specify the maximum number of search iterations which can be performed by the AMA 32 before an error condition is generated. The remaining bits are unspecified.

Figure 7:
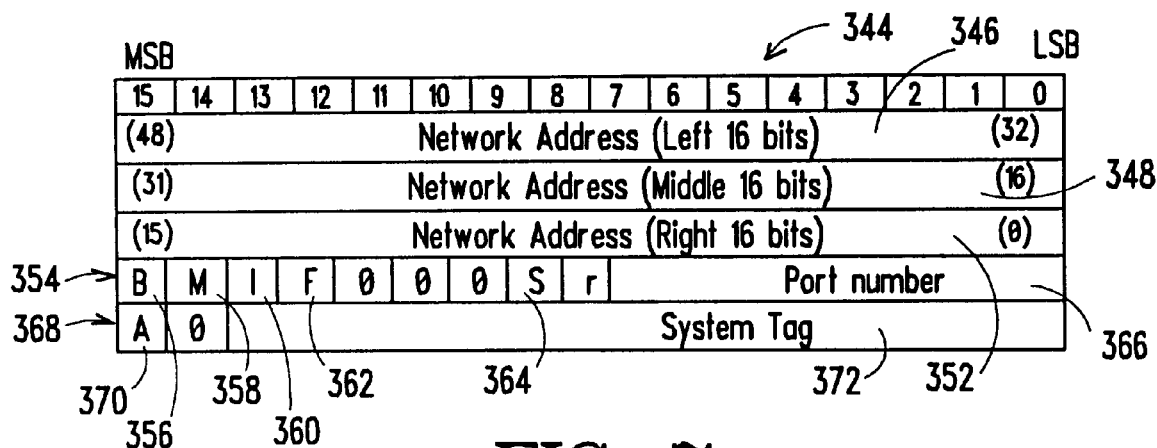
FIG. 7 shows an embodiment of an entry in AMA memory.
Figure 8A:
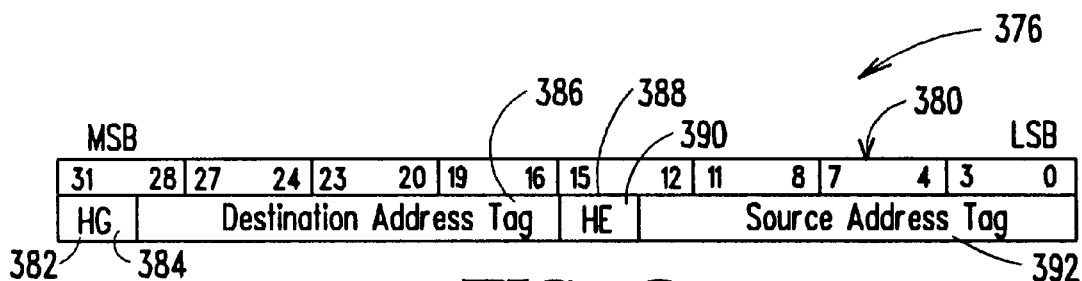
FIGS. 8a and 8b depict an embodiment of AMA status words.
Figure 8B:
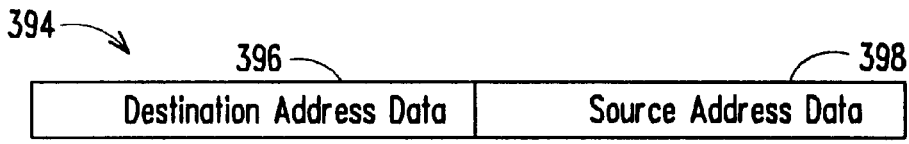

The form of the address table in the AMA memory 36 is shown in FIG. 7. Each entry 344 in the table corresponds to a node known to the AMA 32. The 48 bits of the network address of each node known to the AMA 32 are stored as three, sixteen bit shortwords 346, 348 and 352 beginning each table entry 344. A fourth shortword 354 of the table entry 344 provides various flags and a port number for this particular address. A fifth shortword 368 provides aging information and a system tag.

Specifically, the highest order bit in the fourth shortword 354, designated (B) 356 indicates that this network address is a broadcast address. The next highest bit, designated (M) 358 indicates that this network address is a multicast address. Bit 13, the internal bit (I) 360 indicates that this address belongs to the receiving MAC. If a frame belongs to a receiving MAC, it is either a frame to be routed or a network management frame. Bit 12, the (F) bit 362 indicates that the node's address is associated with an address filter. Filters are used to filter out (i.e., not forward) frames that meet certain criteria. Filters are configurable and the FPU 40 makes filtering decisions on a per frame basis. Bit 8, the static bit (S) 364 indicates that the address is static and was entered by a system manager, rather than being dynamic or learned by the system through packet transfers. Bits six through zero 366 designate the MAC 14, 18 associated with the node having the specified address. All remaining bits are unspecified or reserved.

The fifth shortword 368 of the entry 344 contains fifteen bits, an aging bit (A) 370 and fourteen bits 372 providing a system tag. The aging bit 370 is set whenever the source address 56 of the received packet 46 matches the address entry in the table. The aging bit 370 is periodically cleared by the FPU 40 and, if the bit is not set within a predetermined amount of time, the node address is cleared from the AMA memory 36. Addresses designated as static, by the setting of the static bit 364 (S), cannot be aged from the table. Bits thirteen through zero 372 provide a system tag which is a logical address to the AMA table (as opposed to a physical address). More particularly, a table of logical addresses to the AMA entries is maintained in the SPU's memory 40. This table maintains certain information about the ports, such as filtering information. The reason that the logical address system tag 372 is fourteen bits long (as opposed to the thirteen bits necessary to address each location of the AMA table) is to prevent two AMA table physical addresses from being given the same logical address while the table is being updated, i.e., during the period when one entry is being purged and another added. The remaining bit, bit 14, is unused.

Once the AMA 32 has completed the search of the address table in the AMA memory 36, it returns the information retrieved from the table to the BMA 22 through the AMA interface 340. A Receive Buffer State Machine (RBSM) 94 of the BMA 22 processes this data from the AMA 32 and formats it into two, thirty-two bit words, termed AMA status words 376 shown in FIGS. 8a and 8b. Bit 31 (H) 382 of the first word 380 (FIG. 8a) is a destination hit bit indicating that the packet's destination address 54 was located in the AMA table of addresses. Bit 30 is the group bit (G) 384 indicating that destination address 54 is either a broadcast or a multicast address. Bits twenty-nine through sixteen 386 form a 14 bit identifier used to identify, to the FPU 40, the entry 344 corresponding to the destination address 54. Similarly, bit fifteen is a source hit bit (H) 388 indicating that the packet's source address 56 was located in the AMA table of addresses. Bit fourteen (E) 390 indicates that the port upon which the source address 56 was received is different from the port upon which this address was last learned. Bits thirteen through zero 392 form a fourteen bit identifier used to identify the source memory entry to the FPU 40.

The first 16 bits of the second word 394 (FIG. 8b) contain data 396 associated with the destination node, such as the port through which the node with the destination address 54 can be accessed. The last 16 bits contain data 396 associated with the source address including the port upon which the packet is received.

Figure 17:
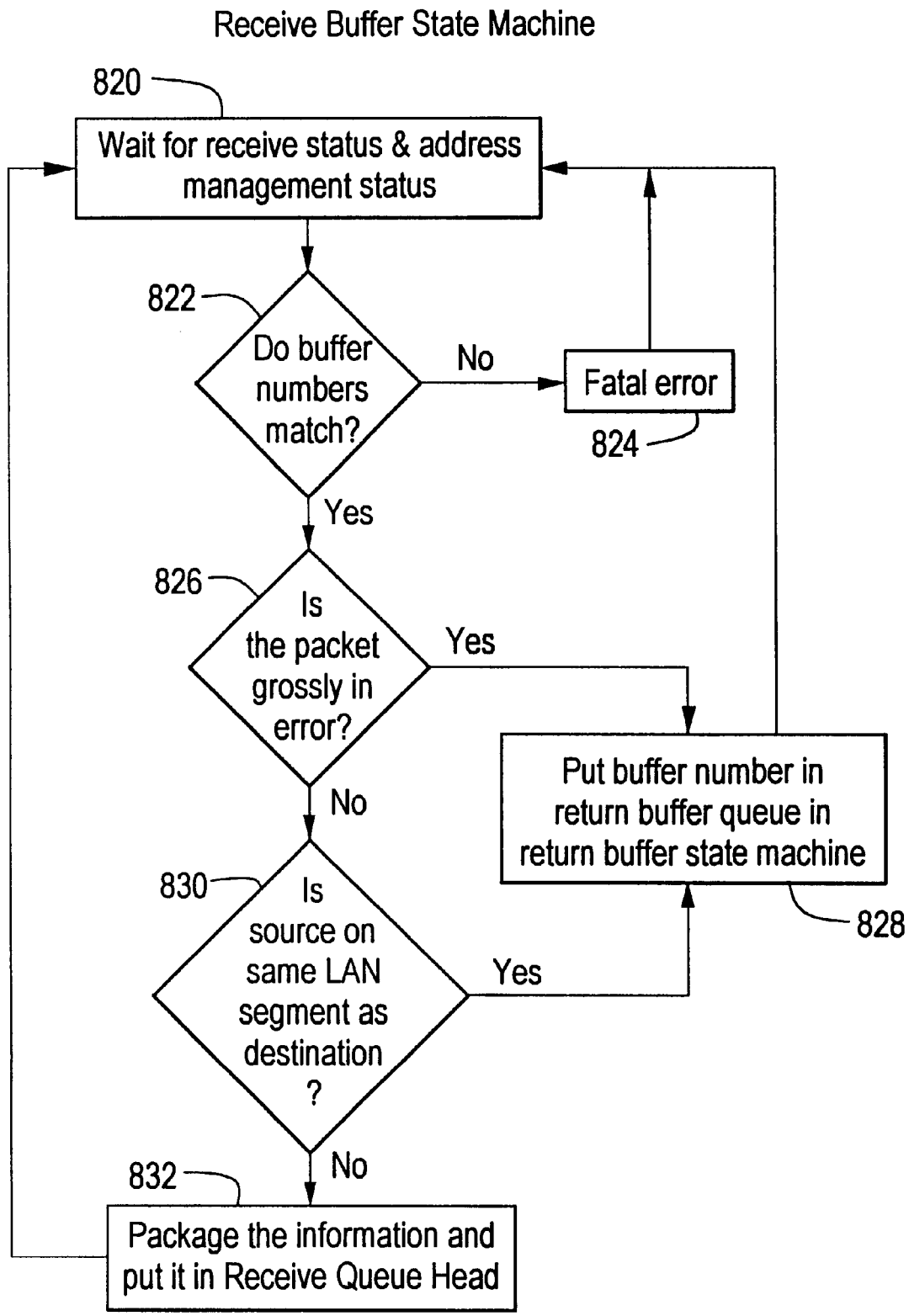
FIG. 17 is a flow chart representation of the operation of the Receive Buffer State Machine.

One use of the AMA status words 376 is in the verification that the AMA 32 has indeed properly identified the received packet as depicted in FIG. 17. This verification is performed by the RBSM 94 comparing received packet identifying characteristics, such as the buffer number in the Receive Queue entry 164, with information contained in the first and second AMA Status registers 400, 402, respectively, such as the buffer number 532 (steps 820, 822). If the comparison fails, the error is considered serious enough to warrant an indication of a fatal error and a re-initialization of the entire internetworking device (step 824) since it would potentially result in misdirected packets. The frame processor 40 can keep track of the number of re-initializations caused by such comparison failures, and can inhibit further function if a threshold value is encountered.

When a packet 46 has been completely received by the BMA 22, the receive status indicated by the MAC 14, 18 is stored in the Receive Status FIFO 306 associated with the MAC 14, 18. The format of entries 416, 418 in the Receive Status FIFO 306 is shown in FIGS. 10a and 10b for the Ethernet and FDDI networks, respectively.

Specifically, the format for an entry 416 (FIG. 10a) in the Receive Status FIFO 306 associated with an Ethernet network is thirty-two bits long and utilizes bits 31 through 24 as a counter 420 indicating the number of collisions detected on the network since the last successfully received packet 46. Bits 23 and 22 (labelled 422 and 424 respectively) are error condition bits indicating that the packet 46 was too short (a runt frame) or too long, respectively. Bits 21 through 17 define a counter 426 which indicates the number of runt frames received since the last successfully received packet. Bits 15 through 12 are error bits which indicate typical Ethernet error conditions, such as: an overrun (O) 428 of a receive FIFO in the Ethernet MAC 14; a collision (C) 430; a framing error (F) 432; or a Frame check sequence (FCS) (E) 434. Bits eleven through zero 436 indicate the number of bytes in the received packet 46. Bit 16 is unspecified.

Similarly, the format of an entry 418 (FIG. 10b) in the Receive Status FIFO 306 associated with an FDDI network is also thirty-two bits long. Bits 31 through 26 indicate that the received packet has characteristics as specified by the frame control entry 57 (FIG. 2). Specifically, bit 31 defines the synchronous class frame bit (C) 440; bit 30 defines the short MAC address frame bit (A) 442 (a received frame error condition); bit 29 is the implementer frame type bit (I) 444 as specified in the frame control field definition of the FDDI ANSI standard; bit 28 is the reserved frame type bit (R) 446; bit 27 is the LLC frame type bit (L) 448 and bit 26 is the SMT/MAC frame type bit (S) 450. Bits 444, 446, 448 and 450 define frame types within FDDI, of which only two (bits 448 and 450) are used for normal data traffic.

Bits 25, 24, 22 through 20, 17 and 15 indicate various receive frame errors. Specifically, bit 25 indicates a Frame Check Sequence (FCS) Error (E) 452; bit 24 indicates a data length error (D) 454; bit 22 indicates that a MAC Reset has been issued and is set as a result of a software or hardware reset, or internal errors (M) 456; bit 21 indicates a format error (non-DATA, IDLE or Ending Delimiter Symbol) (F) 458; and bit 20 indicates that an IDLE symbol was received while expecting part of a Protocol Data Unit (PDU) (usually indicating that the PDU was stripped by a previous node on the network) (s) 460; bit 17 (Ei) 462 indicates that the FDDI MAC 28 detected an error on receive and set an "E" bit in the outgoing frame (at the end of the FDDI frame); and bit 15 ($A_b$) 464 indicates that the received packet 46 was aborted.

Bit 23, the big frame bit (B) 466, indicates that the received packet 46 contained more than 4500 bytes. Bit 19, the ($C_i$) indication bit 468 indicates that a frame copied indication was detected, while bit 18, the ($A_i$) indication bit 470, indicates that an address recognized indication was detected. Finally, bits thirteen through zero 472 indicate the received frame byte count length, including the trailer 52. The remaining bits are unspecified.

Figure 11:
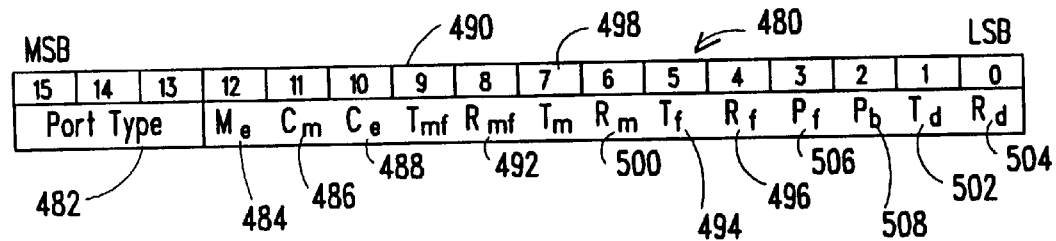
FIG. 11 shows an illustrative data format for the Port Status register of FIG. 3.

In addition to the Receive Status FIFO 306 (FIG. 3), Port Configuration registers 474 located in the RBSM 94 (not shown in FIG. 3) are also associated with each MAC 14, 18 and contain entries having a format shown in FIG. 11 indicating the current configuration for both the receive and transmit data communications paths associated with the MAC 14, 18. The illustrative Port Configuration register word 480 shown in FIG. 11 is sixteen bits long. Bits fifteen through thirteen 482 contain an indication of the type of MAC 14, 18 associated with the Port Configuration register 474. Bit 12, the monitor enable ($M_e$) bit 484 is set if the MAC 14, 18 is being monitored by a remote monitor. In such a case, all packets 46 received and transmitted by the MAC 14, 18 must also be sent to the monitor. Bit 11, the cut-through multicast enable bit ($C_m$) 486, indicates that multicast packets received or sent to this port may undergo cut-through. Similarly, Bit 10, the cut-through enable bit ($C_e$) 488, indicates that unicast packets received from and sent to this port may undergo cut-through. Bits 9, 8, 5 and 4 indicate that a user-defined filter that has been manually assigned to the port is enabled. Specifically, bit nine ($T_{mf}$) 490 indicates a transmit multicast path filter is enabled and should be applied to all multicast packets presented to this port for transmit; bit eight ($R_{mf}$) 492 indicates a receive multicast path filter is enabled and should be applied to all multicast packets received on this port to determine whether or not the multicast packet should be multicasted through the device 10; bit five ($T_f$) 494 indicates a transmit path filter is enabled and should be applied to all packets presented to this port for transmit; and bit four ($R_f$) 496 indicates a receive path filter is enabled and should be applied to all packets received on this port.

Bits 7, 6, 1, and 0 indicate that various paths for this port have been manually disabled at the MAC layer and that all packets presented on this port should be discarded. The setting of these bits causes packets to be discarded by the BMA 22, as contrasted to filtering by the FPU 40. Specifically, bit seven ($T_m$) 498 provides an indication for the transmit multicast path; bit six ($R_m$) 500 provides an indication for the receive multicast path; bit one ($T_d$) 502 provides an indication for the transmit path; and bit zero ($R_d$) 504 provides an indication for the receive path.

Bit three ($P_f$) 506 is used to indicate that the network port is not currently in a "bridge" forwarding state and is not allowed to forward frames. When bit 3 is set, the device 10 can learn addresses from this port, and it must receive and process all network management messages from other internetworking devices. Bit two ($P_b$) 508 is used to indicate that this network port is currently in a "bridge" blocking state and the device 10 is not allowed to forward packet 46 or learn network addresses received on this port, although the device 10 must still receive and process all application messages.

The RBSM can also short circuit the normal received packet (i.e. through the frame processor 40) upon a determination that the packet source and destination are on the same LAN (the unicast situation). In this case (step 830), no translation or retransmission of the received frame is required, and the buffer address is placed in the return buffer queue 636 of the return buffer state machine 114 (step 828) for reentry into the appropriate QCB 214, as described below.

Referring to FIG. 3, the RESM 94 polls the Receive Status FIFO 306 and the AMA Status FIFO 314 to determine how the received packet 46 should be handled. From this information the RBSM 94 generates a two long word Receive Queue entry 164, which includes a code vector and other information required by the FPU 40 in determining how to process the received packet 46.

Figure 12A:
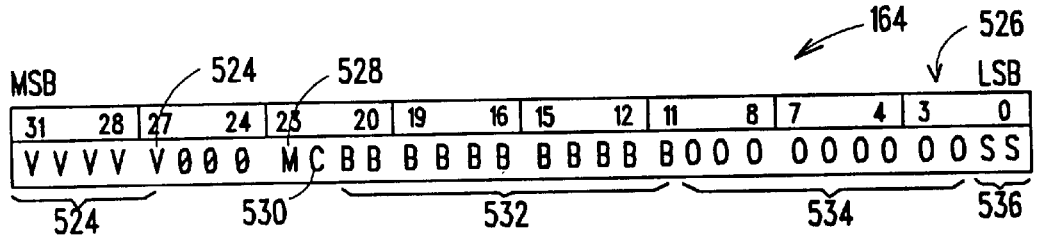
FIGS. 12a and 12b show an illustrative Receive Queue entry in a Receive Queue.
Figure 12B:
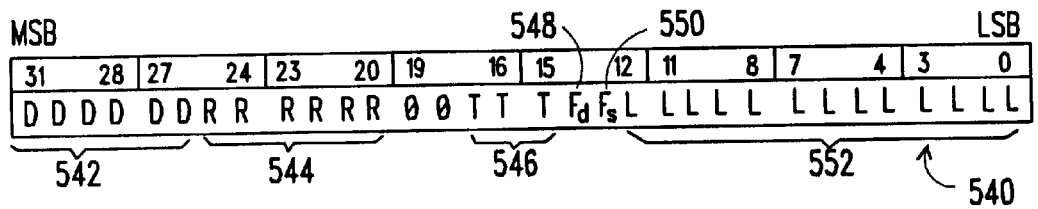

Referring to FIGS. 12a and 12b, the format of the Receive Queue entry 164 is shown. The five highest order bits thirty-one through twenty-seven 524 of the first word 526 (FIG. 11a) of the Receive Queue entry 164 define the code vector which indicates to the FPU 40 which software algorithm should be executed by the FPU 40. Bit twenty-three (M) 528 indicates that the buffer 180 associated with the packet 46 is part of a multi-buffer packet. Bit twenty-two (C) 530 indicates that the packet 46 should be handled as a cut-through packet. Bits twenty-one through eleven 532 indicate which buffer 180 contains the received packet 46. Bits ten through two 534 indicate the body offset pointer 320 (FIG. 6). Finally, bits one and zero 536 identify specific conditions associated with the source address of the received packet 46. The remaining bits are unspecified.

Bits thirty-one through twenty-six 542 of the second word 540 (FIG. 11b) of the Receive Queue entry 164, indicate the destination port of the received packet 46, as determined by the AMA 32. Bits twenty-five through twenty 544 indicate the port number on which the packet 46 was actually received. Bits seventeen through fifteen 546 provide a translation code, indicating the specific packet translation processing required to transmit the received packet information to a remote monitor. Bit fourteen ($F_d$) 548 is set if the destination address 54 was found in the AMA memory 36 and if a filter is enabled in the Port Configuration Register for the destination port. Bit thirteen ($F_s$) 550 is set if the source address 56 was found in the AMA memory 36 and if a filter is enabled in the Port Configuration Register for the source port. Finally, bits twelve through zero 552 specify the length (in bytes) of the received packet 46, exclusive of the trailer 52. The remaining bits are unspecified. Since the packet length can only be known once an entire packet 46 is received, there is no way for a packet undergoing cut-through to have a valid length field entry 552. Thus, for cut-through packets, the length field 552 is set to zero.

The RBSM 94 (FIG. 3) transfers the Receive Queue entry 164 to the Receive Queue 162 located in the control portion 150 of SRAM 28a (FIG. 4A). The RBSM 94 copies entries 164 from the Receive Queue 162 into a Receive Queue Head 560 located in an FPU interface 562, as indicated at step 832 of FIG. 17. The Receive Queue Head 560 contains one entry that is two words long. The FPU 40 reads an entry from the Receive Queue Head 560 and executes an appropriate algorithm from the frame processor memory 564 in response to the code vector 524 and, if applicable, the translation code 546 contained in the Receive Queue entry 164 for that packet (FIG. 11a). When processing requires the FPU 40 to access the packet 46 in the buffer 180, a buffer pointer is used by the FPU 40 to retrieve packet data 50 from the buffer 180. The buffer pointer includes a field specifying the address of the BMA 22, a field specifying the buffer 180 to be accessed and a field specifying the type of buffer access. Illustrative types of buffer access are direct access, in which the FPU 40 reads data from a buffer 180 and processes such data, or request response access in which a read operation is requested, but the FPU bus 566 is available for other data transfer operations and reads the requested data from a register once the data is read from memory.

Figure 18:
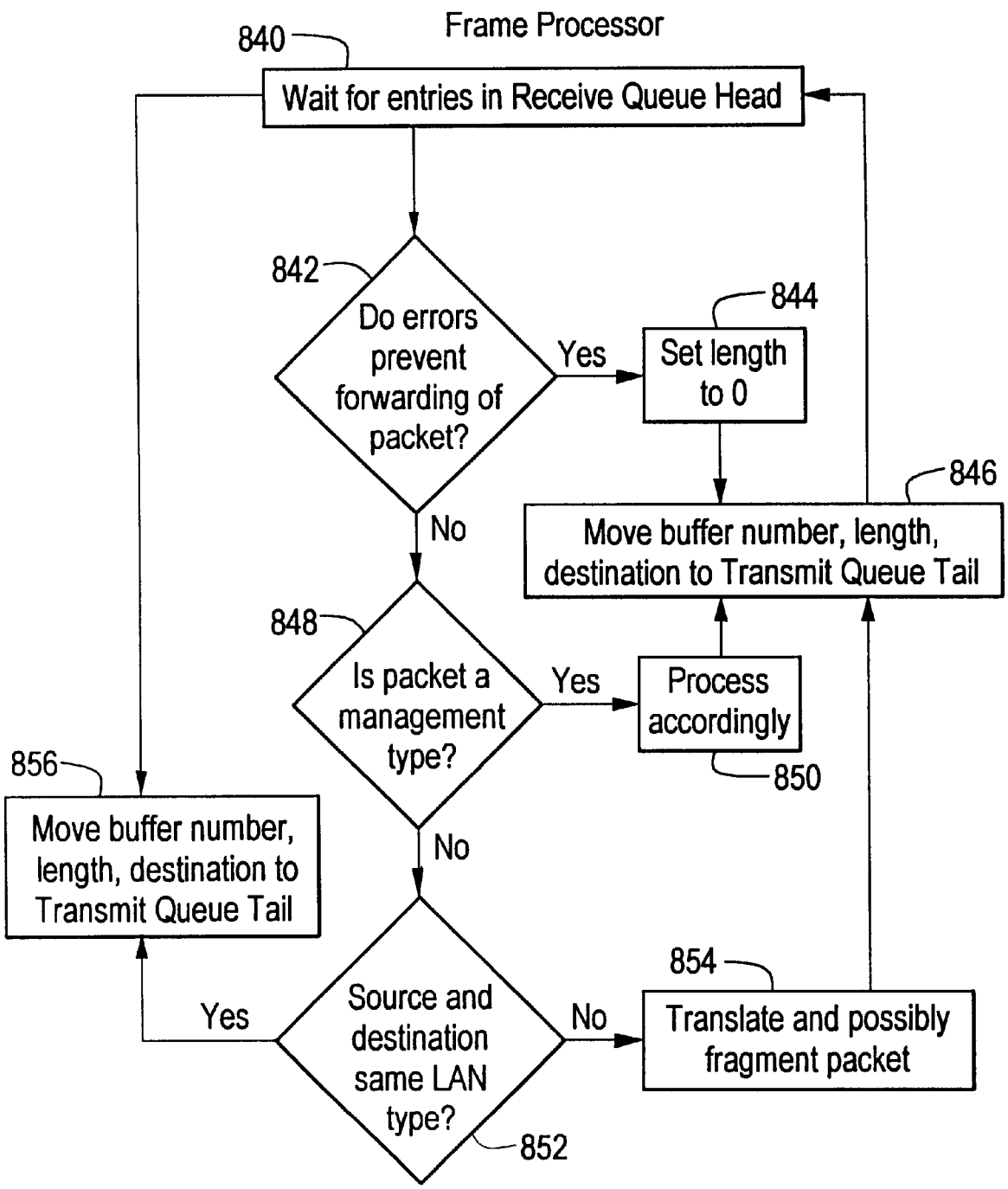
FIG. 18 is a flow chart representation of Frame Processor activity with respect to a received frame.

As indicated in FIG. 18, the FPU 40 reads an entry from the Receive Queue Head 560 (step 840). If errors preventing the transmission of the packet are detected in the Receive Queue Head 560 information (step 842), the length field 552 of the packet 46 is set to zero (step 844) and the buffer number, length (equal to zero) and destination are transferred to a Transmit Queue Tail 580 (step 846). If the frame processor 40 determines that the packet at hand is a management type used for network management only, the frame processor 40 takes whatever actions are dictated by the receipt of the particular packet, then returns the buffer number, packet length, and packet destination to the Transmit Queue Tail 580 (steps 850, 846). If the FPU 40 determines that the source and destination LANs are of the same type, no translation of the packet is required, and the buffer number, length and destination are moved into the Transmit Queue Tail 580 (steps 852, 856). If none of the foregoing conditions are met, the FPU 40 executes an appropriate algorithm from the frame processor memory 564 in response to the code vector 524 and, if applicable, the translation code 546 contained in the Receive Queue entry 164 for that packet (FIG. 11a), as indicated in step 854 of FIG. 18. The buffer number, length and destination are then moved into the Transmit Queue Tail 580. Communication between the FPU 40, the frame processor memory 564, the BMA 22, and the AMA 32 is via an FPU Bus 566.

Once the FPU 40 has completed the algorithm invoked by the code vector 524, the FPU 40 enqueues, in a Transmit Queue Tail 580 (FIG. 3), a Transmit Queue entry 160. In one embodiment, the Transmit Queue Tail 580 can contain up to three entries, each two long words in length.

Figure 13:
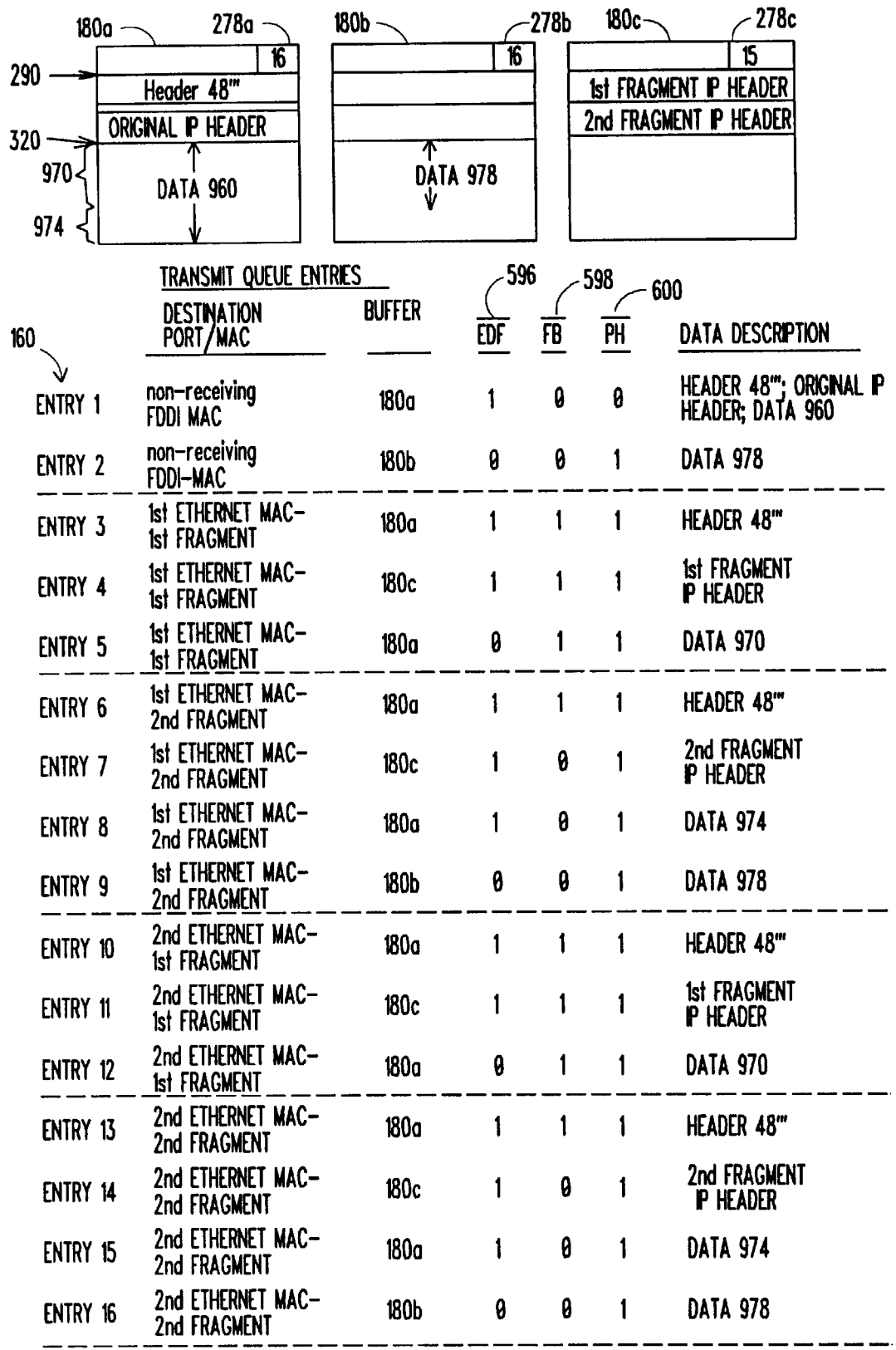
FIG. 13 shows illustrative buffers containing a received FDDI packet and Transmit Queue entries associated with multicast transmission of the packet.
Figure 14A:
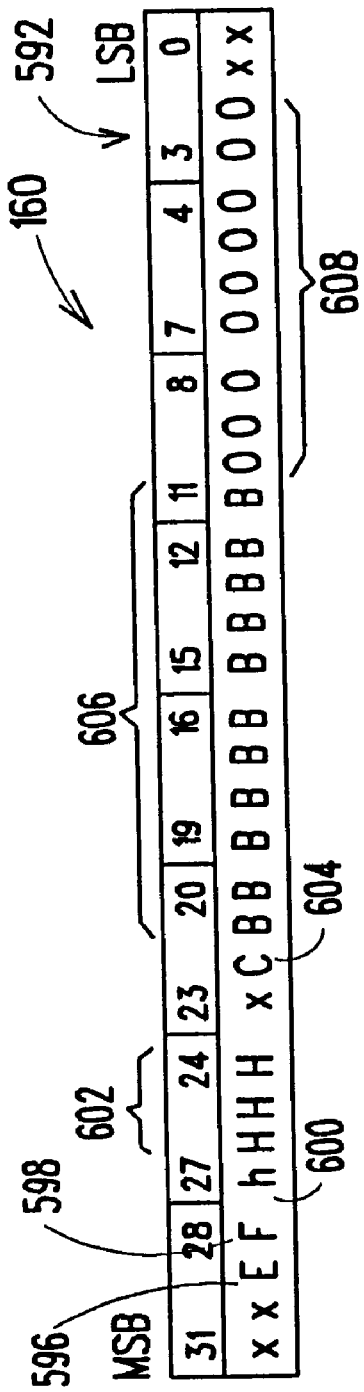
FIGS. 14a and 14b show an illustrative data format for a Transmit Queue entry in a Transmit Queue.
Figure 14B:
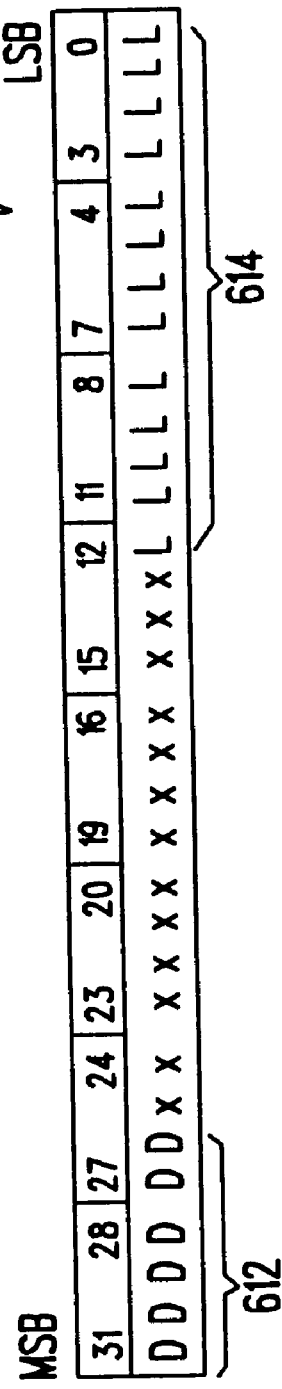

The Transmit Queue entry 160 defines the transmission parameters, as shown in FIGS. 14a and 14b, and includes two, thirty-two bit words 592, 594. Bit 29 (E) 596 of the first word 592 (FIG. 14a) is a "not end of frame" bit, which indicates that the data described by the Transmit Queue entry is part of a multi-fragment frame. Subsequent entries in the Transmit Queue Tail 580 define the remaining data for this packet. Bit 28 (F) 598 is a "do not free buffer" bit which is used by the DMA controller 74 to determine whether or not to return the buffer 180. Whether the packet buffer 180 is actually returned depends additionally upon the Buffer Used Count field 278 (FIG. 6), as described below in conjunction with FIG. 13. Bit 27 (h) 600 of the Transmit Queue entry 160 is a "do not prefix header" bit indicating whether or not to prefix the buffer contents starting at the body offset pointer 320 with the buffer contents starting at the header offset pointer 290. Bits twenty-six through twenty-four 602 define a header supplement length field indicating the number of additional bytes (written into the translation gap 298 by the FPU 40) to be transmitted with the buffer contents starting at the header offset pointer 290 as a result of frame translation. A header supplement length field value of zero indicates that no supplemental header bytes are to be transmitted. In cases where the "do not prefix header" bit 600 is set, the header supplement length field 602 is ignored, since the header portion in the buffer 180 is not to be transmitted.

Bit 22 (C) 604 is a cut-through frame bit indicating whether or not the internetworking device 10 is to begin re-transmitting the received packet 46 prior to the packet being completely received by the device. Bits twenty-one through eleven 606 define a transmit buffer number specifying the number of the buffer 180 containing the packet 46 to be transmitted, while bits ten through two 608 specify the body offset pointer 320. The remaining bits are unspecified.

Bits thirty-one through twenty-six 612 of the second word 594 (FIG. 14b) define a destination port field identifying to which of the eighteen MACs 14, 18 the transmission is to be sent. Bits twelve through zero 614 provide a packet length field specifying the number of bytes in the packet 46 to be transmitted. Note, however, the trailer portion 52 (FIG. 2) of the packet 46 is not included in the packet length field 614 since the trailer 52 is added by the transmitting MAC 14, 18. The remaining bits are unspecified.

Referring to FIG. 13, the operation of the Buffer Used Count field 278 (FIG. 6) and the "do not free buffer" bit 598 in the return of buffers 180 for re-use will be described in conjunction with illustrative buffers 180a, 180b and 180c. Buffers 180a and 180b contain an FDDI frame received by the BMA 22 in the manner described above. Initially, the FDDI header 48''' and a portion 960 of the received FDDI data 50''' are stored in buffer 180a. The remaining portion 978 of the received FDDI data 50''' is stored in the second buffer 180b, as shown. In the illustrative example, the received packet is intended for multicast transmission to all of the other MACs 14, 18. That is, the received FDDI data 50''' is intended for transmission to the non-receiving one of the two FDDI MACs 18 and to the sixteen Ethernet MACs 14. To this end, the Buffer Used Count field 278a, 278b of each buffer 180a, 180b, respectively, is initialized to a value of sixteen (i.e., the number of ports on which the data in the respective buffer is to be transmitted minus one), corresponding to transmission of the data contained in each of the buffers 180a, 180b by the seventeen other MACs. Buffer 180c contains Internet Protocol (IP) headers which are written during the header translation process and from which IP headers are taken when frames are fragmented for transmission, as described below. The Buffer Used Cont 278c associated with buffer 180c is initialized to a value of fifteen since the IP headers contained therein are used in the fragmented transmission of the received FDDI frame to the sixteen Ethernet MACs only (i.e., buffer 180c is not used in the transmission to the other FDDI MAC).

Also shown in FIG. 13 are selected fields with the Transmit Queue entries 160 associated with multicast transmission of the received FDDI packet. Specifically, the destination port/MAC and the buffer identifiers are depicted. Also shown in FIG. 13 are the "not end of frame" bit 596, the "do not free buffer" bit 598, and the "do not prefix header" bit 600. A "not end of frame" bit value of one indicates that the respective entry is not the last transmission of the particular frame. A "do not prefix header" bit value of one indicates that the address header stored in the respective buffer is not to be transmitted with the data specified by the respective Transmit Queue entry 160, because the packet is part of a multi-fragment frame and an IP header from buffer 180c is associated with that IP fragment transmission. 4 The "do not free buffer" bit 598 operates as an enable/disable bit for controlling the counter that decrements the Buffer Used Count 278. A "do not free buffer" bit value of one indicates that the buffer is not a candidate for return to the respective Free Buffer Queue 154, 157 and hence the Buffer Used Count 278 will not be decremented. If the "do not free buffer" bit 598 is zero, then the respective Buffer Used Count 278 may be decremented. The "do not free buffer" bit is zero when the buffer contents are being transmitted by the designated port (i.e., MAC) for the last time.

The first two entries in the Transmit Queue 158 correspond to transmission of the received FDDI packet to the non-receiving FDDI MAC 18. More particularly, the first entry corresponds to transmission of the data 960 from buffer 180a to the non-receiving FDDI MAC 18 and the second entry corresponds to transmission of the data 978 from buffer 180b to the non-receiving FDDI MAC 18.

In the first entry in the Transmit Queue 158, the "not end of frame" bit 596 is set, indicating that this transmission is not the end of the FDDI frame. The "do not free buffer" bit 598 on the other hand is zero, indicating that the contents of buffer 180a are being transmitted for the last time to the particular port, in this case, the non-receiving FDDI port. In response to the "not end of frame" bit 598 being zero, the Buffer Used Count 278a of the associated buffer 180a is decremented. Thus, after entry 1 in the Transmit Queue 158 is transmitted, the Buffer Used Count 278a is decremented to fifteen. Also, the "do not prefix header" bit 600 is zero indicating that the transmission of the data 960 of buffer 180a is to be prefixed with the header 48'" stored in buffer 180a.

In the second entry in the Transmit Queue 158 associated with transmission of data 978 from buffer 180b, the "not end of frame" bit 596 is zero, thereby indicating that this entry corresponds to the end of the particular frame. The "do not free buffer" bit 598 is also zero, indicating that the contents of buffer 180b are being transmitted for the last time by the non-receiving FDDI MAC 18. Thus, after entry 2 is transmitted, the Buffer Used Count field 278b associated with buffer 180b is decremented to a value of fifteen. The "do not prefix header" bit 600 is set, indicating that a header is not to be transmitted from buffer 180b.

Once the first and second Transmit Queue entries have been transmitted, the received FDDI packet is transmitted to a first one of the Ethernet MACs 14. The transmission of the received FDDI frame to the first Ethernet MAC 14 is accomplished by the transmission of two IP fragments, since the received FDDI frame is larger than a single Ethernet frame. A first IP frame fragment is transmitted to the first Ethernet MAC 14 by Transmit Queue entries 3, 4 and 5 and includes a first portion 970 of the data 960 stored in buffer 180a. A second IP frame fragment is transmitted to the first Ethernet MAC 14 by Transmit Queue entries 6, 7, 8 and 9 and contains the remainder 974 of the data 960 stored in buffer 180a, as well as the data 978 from buffer 180b.

Entry 3 begins the first IP frame fragment transmitted by the first Ethernet MAC 14 and more specifically corresponds to transmission of the address header stored in buffer 180a. More particularly, in entry 3, the "not end of frame" bit 596 is set, indicating that this transmission is not the last of the particular frame and the "do not prefix header" bit 600 is set indicating that the header stored in buffer 180a is not to be transmitted. The "do not free buffer" bit 598 is set in this case, thereby disabling the counter that decrements the Buffer Used Count 278a, since the contents of buffer 180a are not being transmitted to the first Ethernet MAC for the last time.

The fourth entry in Transmit Queue 158 corresponds to the transmission of the first fragment IP header from buffer 180c. The "not end of frame" bit 596 is set in entry 4, indicating that this transmission is not the last of the particular frame fragment. The "do not free buffer" frame 598 is set, thereby disabling the counter which decrements the Buffer Used Count 278c, since the contents of buffer 180c are not being transmitted by the first Ethernet MAC 14 for the last time. The "do not prefix header" frame 600 is also set, indicating that an address header from buffer 180c is not to be transmitted.

The transmission of the first IP frame fragment of the received FDDI frame by the first Ethernet MAC 14 is completed with the fifth entry, in which the "not end of frame" bit 596 is not set, indicating that entry 5 represents the end of the first IP frame fragment. The "do not free buffer" bit 598 is set, specifying that the contents of buffer 180a are being used for the last time for transmission by the first Ethernet MAC 14 and the "do not prefix header" bit 600 is set, indicating that no address header from buffer 180a is to be transmitted with entry 5.

Entry 6 begins the second IP frame fragment transmitted by the first Ethernet MAC 14 and more specifically corresponds to transmission of the address header stored in buffer 180a. To this end, the "not end of frame" bit 596 is set, since entry 6 does not represent the end of the particular frame fragment. Also, the "do not free buffer bit" 598 is set, thereby disabling the Buffer Used Count counter since buffer 180a is not being used for the last time by the first Ethernet MAC 14. Also, the "do not prefix header" bit 600 is set, preventing the address header 48'" stored in buffer 180a from being transmitted. Entry 7 corresponds to transmission of an IP header with this second IP frame fragment. Specifically, in entry 7, the "not end of frame" bit 596 is set since this entry is not the last of the particular IP frame fragment. The "do not free buffer" bit is not set, thereby enabling the counter that decrements the Buffer Used Count 278c associated with buffer 180c to decrement the count to fourteen, since buffer 180c is being used for the last time by the first Ethernet MAC. Also, the "do not prefix header" bit 600 is set, indicating that an address header from buffer 180c is not to be transmitted. Entry 8 corresponds to the transmission of the rest of the data 974 in buffer 180a. More particularly, in entry 8, the "not end of frame" bit 596 is set since this entry does not represent the last entry of the second IP frame fragment. The "do not free buffer" bit 598 is not set, causing the Buffer Used count 278a associated with buffer 180a to be decremented to fourteen, since buffer 180a is being used for the last time in the transmission by the first Ethernet MAC 14. The "do not prefix header" bit 600 is set, thereby preventing the address header 48''' stored in buffer 180a from being transmitted with the second IP frame fragment. Entry 9 corresponds to the transmission of the data 978 from buffer 180b and is the last entry associated with the second IP frame fragment transmitted by the first Ethernet MAC 14. Thus, the "not end of frame" bit 596 in entry 9 is not set, indicating the end of the frame fragment. The "do not free buffer" bit 598 is not set, thereby permitting the Buffer Used count 278b associated with buffer 180b to be decremented to fourteen, since this is the last time buffer 180b is used by the first Ethernet MAC.

Bits 596, 598 and 600 of entries 10, 11 and 12 are identical to like bits in entries 3, 4 and 5 and correspond to a first IP frame fragment of the received FDDI frame being transmitted by the second Ethernet MAC. Similarly, bits 596, 598 and 600 of entries 13, 14, 15 and 16 are identical to like bits in entries 6, 7, 8 and 9 and correspond to a second IP frame fragment of the received FDDI frame being transmitted by the second Ethernet MAC. In view of the above discussion, it will become apparent that the multicast transmission of the received FDDI packet requires ninety-eight additional entries in the Transmit Queue 158 which are not shown in FIG. 13 but which are identical to entries 3–9, albeit specifying the remaining fourteen Ethernet MACs.

The TFSM 620 transfers entries from the Transmit Queue Tail 580 into a Transmit Queue 158, located in the control portion 150 of the SRAM 28a, and associated with the destination MAC 14, 18. The Prefetch State Machine 242 of the DMA controller 74 polls each of the Transmit Prefetch Queues 182 to determine whether any such Queues 182 has an empty location. If any of the Transmit Prefetch Queues can accept another entry, then the Prefetch State Machine 242 polls the respective Transmit Queue 158 in accordance with the pointers stored in the respective Transmit QCB 190 and loads the next entry for transmission into the respective Transmit Prefetch Queue 182. Thereafter, the DMA controller 74 sends a request to one of the arbiters 70a, 70b for permission to access a buffer to transmit the contents thereof to the destination MAC 14, 18 associated with that queue entry. Upon the grant of such a request by the arbiter 70, the packet 46 is transmitted to the destination MAC 14, 18 under the control of the DMA controller 74.

When the TFSM 620 identifies an entry in the Transmit Queue Tail 580 (FIG. 19, step 860), the length field is analyzed. If this field is set to zero (step 862), the buffer information is not to be transmitted. Thus, the buffer number is entered into a return buffer queue within the return buffer state machine 114 (step 864). If the length field is not set to zero, the TFSM 620 transfers entries from the Transmit Queue Tail 580 (buffer number and length information) into a Transmit Queue 158, located in the control portion 150 of the SRAM 28a, the Transmit Queue 158 associated with the destination MAC 14, 18 (FIG. 19, step 866).

A Transmit Enqueue state machine 640, forming a part of the Prefetch State Machine 242, is included in the DMA Controller 74 and is responsible for polling each of the Transmit Queues 158 (FIG. 20, step 870). When this state machine 640 encounters an entry 160 in a queue 158, it determines if an associated Transmit Prefetch Queue 182 is full. If not, the Transmit Enqueue state machine 640 prefetches the Transmit Queue entry 158 into the Prefetch queue 182 within the DMA controller 74, shown in FIG. 5 and in FIG. 20 at steps 872, 874, 876. Each of the eighteen (in the illustrated embodiment) Transmit Prefetch queues 182 are twenty-four bits wide, including eleven buffer address bits and thirteen packet length bits defining the number of bytes in the packet. Additionally, there are three control bits (do not free, last fragment of frame, cutthroat) for a total of twenty-seven.

Figure 21:
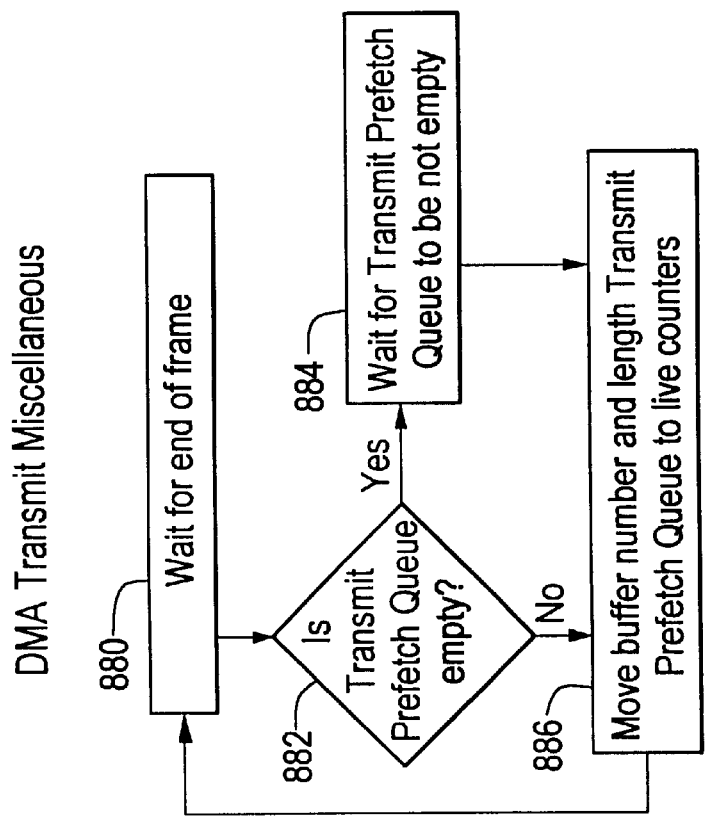
FIG. 21 is a flow chart representation of the live counter operation of the Transmit Enqueue State Machine.

The DMA controller 74 also includes Transmit live registers 644, each register 646 associated with a respective channel. If the DMA controller determines that one of the Transmit Prefetch queues 182 is empty (FIG. 21, step 880, 882), it will wait for the that Transmit Prefetch queue 182 to have an entry (i.e. it will wait for the Transmit Prefetch state machine to transfer a buffer and length into the respective Prefetch queue 182, as in FIG. 20). Once such an entry is detected by the DMA controller 74, the entry is moved into a respective Transmit live address counter 646. As with the Receive live address counter 634, providing the next buffer address to be transmitted from in a live address counter 646 simplifies the ability to mathematically manipulate the address stored in the counter 646 during frame transmission.

Each Transmit live address counter 646 is twenty-four bits long, providing eleven bits of buffer address and thirteen bits for the packet length. The transfer of a Transmit Prefetch queue 182 entry into the live address counter 646 is reflected in FIG. 21 at steps 882, 884, 886.

Once the DMA controller 74 has installed the next buffer to be transmitted in the Transmit live address counter 646, it sends a request to the arbiters 70a, 70b for permission to transmit to the destination MAC 14, 18 associated with that counter entry. Upon the grant of such a request by the arbiter 70, the packet 46 is transmitted to the destination MAC 14, 18 under the control of DMA controller 74.

Once the transmission is completed to the destination network, the transmitting MAC 14, 18 provides transmit status information to the TSSM 118 through the NIU 60, 62, including whether any transmission errors were encountered. Transmit status information may be monitored by the FPU 40 via a Transmit Status Queue Head 582 for statistical purposes. The Transmit Status Queue Head 582 works in similar fashion to the Receive Queue Head 560 in providing information to the FPU 40. In this case, only error transmit status from the TSSM 118 is made available to the FPU 40 via the Transmit Status Queue Head 582 for analysis.

After the data described by a Transmit Prefetch Queue Entry has been transmitted by the DMA controller 74, the DMA controller checks to see if the "do not free" bit is set in that entry. If it is, then the DMA controller 74 is done with this transmit operation. If the "do not free" bit is reset, then the DMA controller 74 passes the buffer number from the Transmit Prefetch Queue Entry to the Return Buffer State Machine 114. The Return Buffer State Machine 114 then uses this buffer number to read the Buffer Used Count field 278 of the transmitted buffer 180. If the Buffer Used Count is at a value of zero, then the buffer 180 is returned to the respective Free Buffer Queue 154, 157, for re-use.

Figure 22:
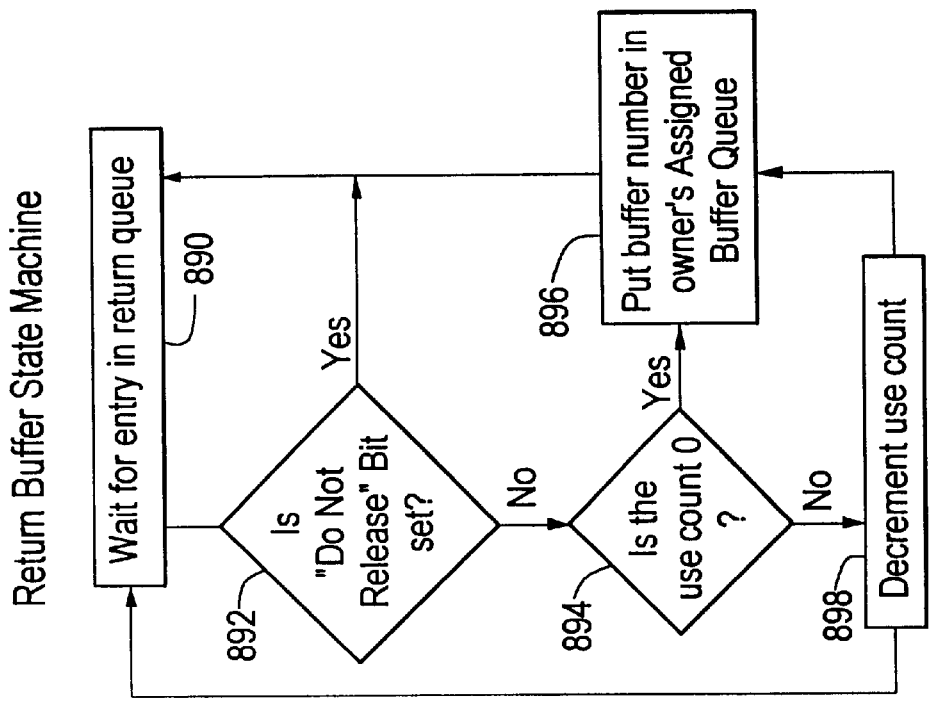
FIG. 22 is a flow chart representation of the operation of the Return Buffer State Machine.

Simultaneously, the DMA controller 74 notifies the Return Buffer state machine 114 that the packet 46 has been transmitted to the destination network. In response, the return buffer state machine 114 determines whether the "do not free buffer" bit 598 of the corresponding transmit live address counter 646 is set, as at steps 890, 892 of FIG. 22. If this bit 598 is not set, then the buffer 180 is a candidate to be released and the Buffer Used Count field 278 in the buffer 180 is checked by the Return Buffer state machine 114. If the value of the Buffer Used Count field 278 is zero, then the buffer 180 is released to the Free Buffer Queue 154 of the MAC 14, 18 specified in the Buffer Owner field 274. Such is illustrated in FIG. 22 at steps 894, 896, 898. If the count is not zero, then the count is decremented and the buffer 180 is not released. As mentioned above, the Buffer Used Count field 278 is set to a non-zero value if the buffer data 50 is being multicast and specifically, is set to a value indicating the number of multicast transmissions. In such a case, the buffer 180 can only be released upon completion of the last transmit operation.

Upon return, the TFSM 620 writes the buffer's address in the Free Buffer Buffer Queue 154, 157 at the location subsequent to the location indicated by the READ pointer 224, 240. Additionally, the DMA controller 74 notifies the Return Buffer State Machine 114 of the desire to return of the buffer. In response, the Return Buffer State Machine increments the READ pointer 224, 240 in step 896. Subsequent increments of the WRITE pointer 220, 236 will point to the released buffer 180, thereby permitting the released buffer to be once again fetched by the DMA controller 74 for inclusion in the respective Free Buffer Prefetch queue 200.

As discussed above, if the received packet 46 has a destination address 54 of a node on a network of the same type as the source network, and if certain other criteria are met, then the RBSM 94 does not wait for the Receive Status FIFO 306 information before enqueueing the Receive Queue entry 164 (FIGS. 11a and 11b). In such a case, the packet 46 is enqueued by the FPU 40 in the Transmit Queue Tail 580 prior to the packet 46 being completely received and stored in the buffer 180.

Alternatively, it may be determined by the RBSM 94 that a received packet should not be transmitted by the device 10. In this case, the RBSM 94 provides the buffer number to the Return Buffer state machine 114, and the previously described process for returning the packet receiving buffer 180 to the Free Buffer Queue 154, 157 is repeated.

These and other examples of these concept of the invention illustrated above are intended by way of example and the actual scope of the invention is to be determined by the claims.

What is claimed is:

1. A method of receiving and transmitting a data block in a network gateway having a buffer set addressed by buffer lists, the buffer set associated with a port set, the method comprising:

receiving said data block at a first port of said port set;

referring to a first buffer list having addresses of first buffers accessible only by said first port to retrieve addresses of unused first buffers;

referring to a second buffer list having addresses of second buffers accessible by every port in said port set to retrieve addresses of unused second buffers;

storing said data block in said unused first buffers, and in said second unused buffers after all of said unused first buffers have been used for storing; and transmitting said data block at a second port of said gateway.

2. The method according to claim 1, wherein the step of receiving said data block further comprises:

correlating a receive port identifier with said first buffer list, said receive port identifier identifying said first port on which said data block was received.

3. The method according to claim 1, wherein the step of referring to a first buffer list further comprises:

maintaining a first control block for said first buffer list in a memory access controller, said first control block containing a label corresponding to each of said first buffer addresses in said first buffer list.

4. The method according to claim 3, wherein the step of referring to a first buffer list further comprises:

storing said first control block in a memory access controller register having multiple pointers associated with said first control block, said multiple pointers providing an indication of used first buffers and unused first buffers whose addresses are within said first buffer list.

5. The method according to claim 4, wherein the step of storing said data block further comprises adjusting said first control block multiple pointers to indicate usage of at least one first buffer addressed by said first buffer list.

6. The method according to claim 1, wherein the step of referring to a second buffer list further comprises:

maintaining a second control block for said second buffer list in a memory access controller, said second control block containing a label corresponding to each of said second buffer addresses in said second buffer list.

7. The method according to claim 6, wherein the step of referring to a second buffer list further comprises:

storing said second control block in a memory access controller register having multiple pointers associated with said second control block, said multiple pointers providing an indication of used second buffers and unused second buffers whose addresses are within said second buffer list.

8. The method according to claim 7, wherein the step of referring to a second buffer list further comprises:

maintaining a memory access controller register containing labels corresponding to reserved second buffers whose addresses are within said second buffer list, said reserved second buffers being inaccessible to said ports.

9. The method according to claim 7, wherein the step of storing said data block further comprises adjusting said second control block multiple pointers to indicate usage of at least one second buffer addressed by said second buffer list.

10. The method according to claim 1, wherein the step of storing said data block further comprises:

writing a first portion of said data block in a first memory device; and writing a second portion of said data block in a second memory device.

11. The method according to claim 1, wherein the step of transmitting said data block further comprises:

indicating within said first buffer list that each first buffer address corresponding to a first buffer in which said data block was stored is now unused; and indicating within said second buffer list that each second buffer address corresponding to a second buffer in which said data block was stored, if any, is now unused.

* * * * *